(12) United States Patent
Takeyama

(10) Patent No.: US 7,362,523 B2
(45) Date of Patent: Apr. 22, 2008

(54) METHOD FOR PRODUCING HOLOGRAPHIC RECORDING MEDIUM

(75) Inventor: Toshihisa Takeyama, Hachioji (JP)

(73) Assignee: Konica Minolta Medical & Graphic, Inc., Tokyo (JP)

( * ) Notice: Subject to any disclaimer, the term of this patent is extended or adjusted under 35 U.S.C. 154(b) by 264 days.

(21) Appl. No.: 10/846,896

(22) Filed: May 14, 2004

(65) Prior Publication Data

US 2004/0240010 A1  Dec. 2, 2004

(30) Foreign Application Priority Data

May 28, 2003   (JP)  ............................. 2003-150734

(51) Int. Cl.
*G03H 1/02*  (2006.01)
(52) U.S. Cl. .............................. 359/900; 359/3; 359/1; 430/2; 156/598
(58) Field of Classification Search ................. 359/15, 359/9, 3, 7, 900; 430/2
See application file for complete search history.

(56) References Cited

U.S. PATENT DOCUMENTS

| | | | |
|---|---|---|---|
| 5,719,691 A | 2/1998 | Curtis et al. | |
| 5,744,193 A * | 4/1998 | Kitano | 427/162 |
| 5,759,721 A | 6/1998 | Dhal et al. | |
| 6,103,454 A | 8/2000 | Dhar et al. | |
| 6,478,069 B1 * | 11/2002 | Fujisaku et al. | 156/584 |
| 2002/0135829 A1 * | 9/2002 | Edwards et al. | 359/3 |
| 2002/0145772 A1 | 10/2002 | Hegel | |
| 2005/0214682 A1 * | 9/2005 | Edwards et al. | 430/270.12 |
| 2005/0250016 A1 * | 11/2005 | Takeyama | 430/1 |

FOREIGN PATENT DOCUMENTS

| | | |
|---|---|---|
| JP | 10-340479 A | 12/1998 |
| JP | 2002-123949 A | 4/2002 |

* cited by examiner

*Primary Examiner*—Fayez G. Assaf
(74) *Attorney, Agent, or Firm*—Frishauf, Holtz, Goodman & Chick, P.C.

(57) ABSTRACT

A method for producing a holographic recording medium having a holographic recording layer between a first substrate and a second substrate including the steps of: providing a holographic recording layer forming composition onto the first substrate, forming the holographic recording layer between the first substrate and the second substrate by facing the second substrate to the first substrate, and hardening the holographic recording layer by at least one of heat and light.

23 Claims, 19 Drawing Sheets

FIG. 1 (a) FIG. 1 (b) FIG. 1 (c) FIG. 1 (d)
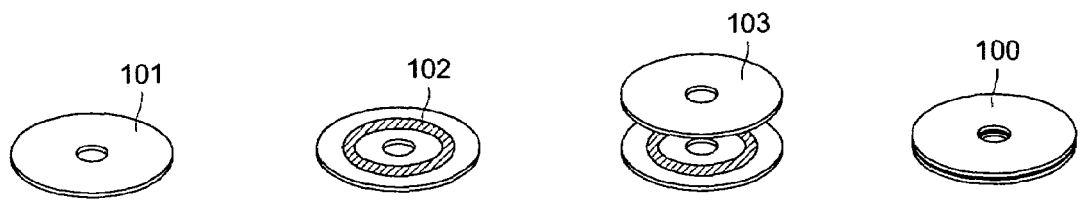
FIG. 2 (a) FIG. 2 (b)
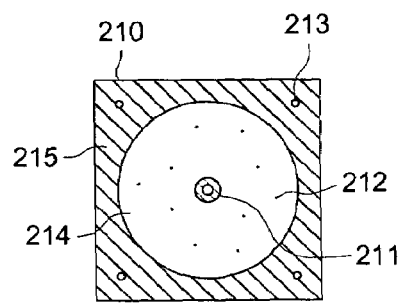 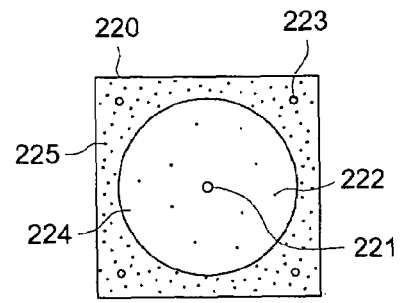
FIG. 2 (c) FIG. 2 (d)
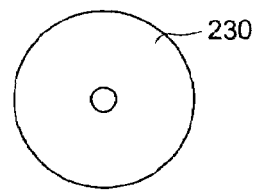 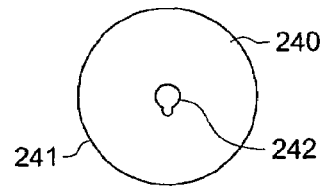

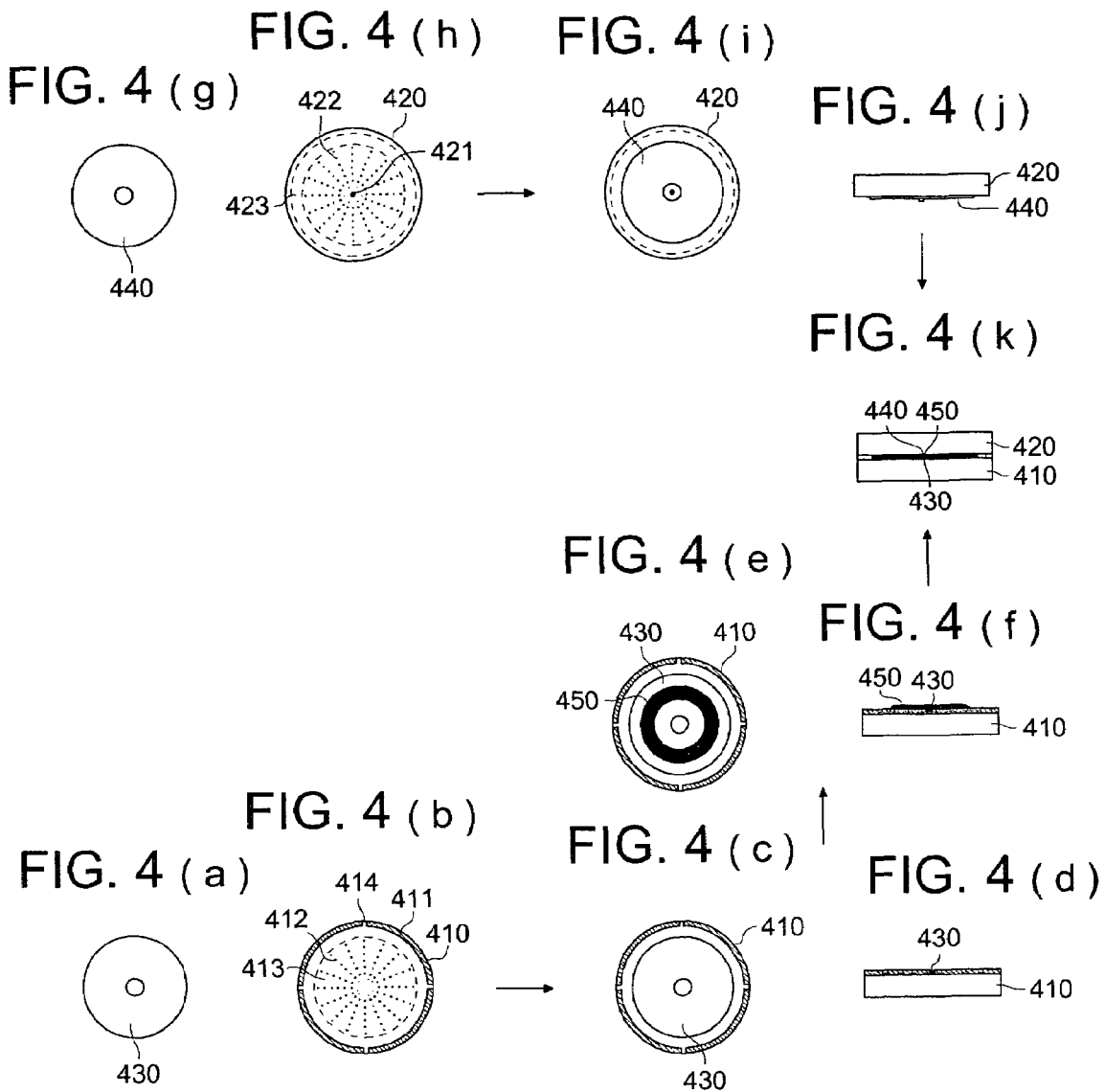

FIG. 6
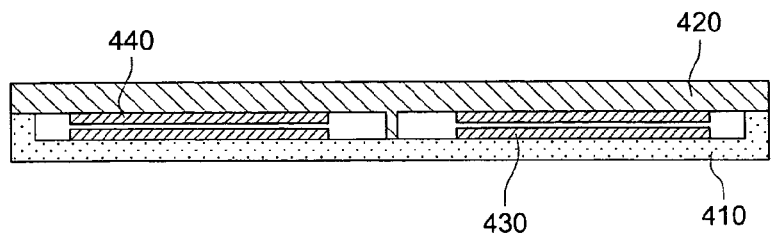
FIG. 7
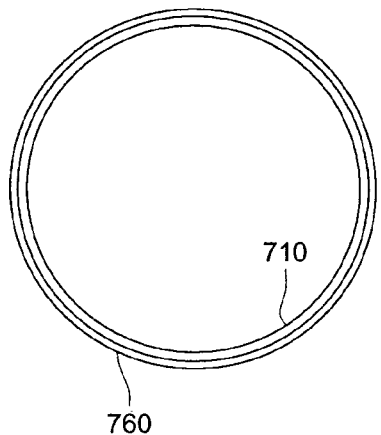
FIG. 8(a)   FIG. 8(c)   FIG. 8(e)
  FIG. 8(b)   FIG. 8(d)
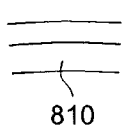
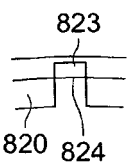
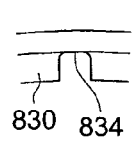
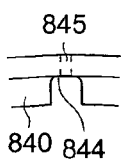
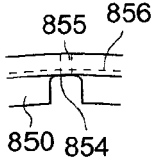
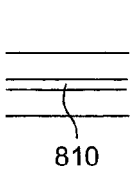
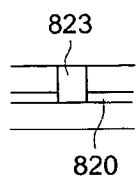
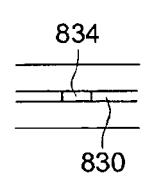
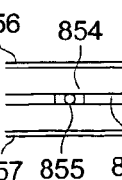
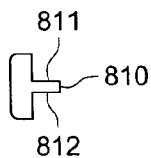
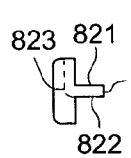
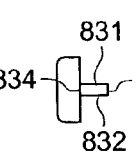
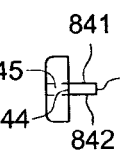
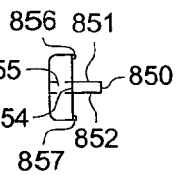

FIG. 12 ( a )     FIG. 12 ( b )     FIG. 12 ( c )
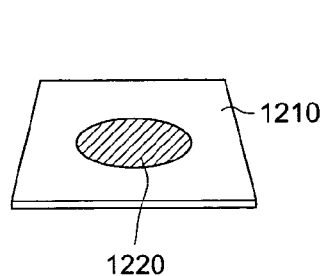 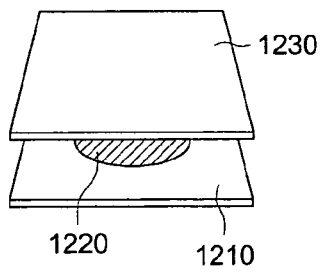 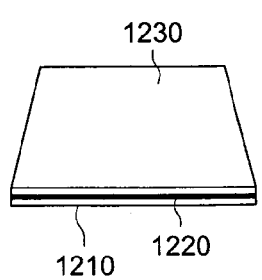
FIG. 12 ( d )     FIG. 12 ( e )
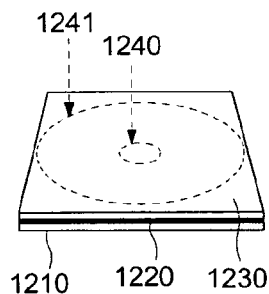 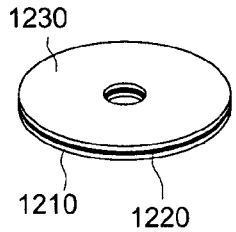
FIG. 13 ( a )     FIG. 13 ( b )     FIG. 13 ( c )
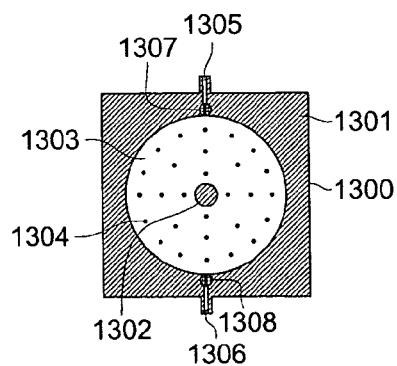 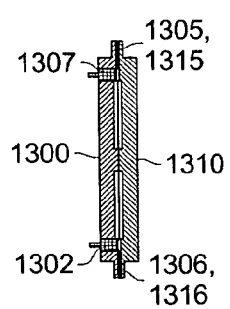 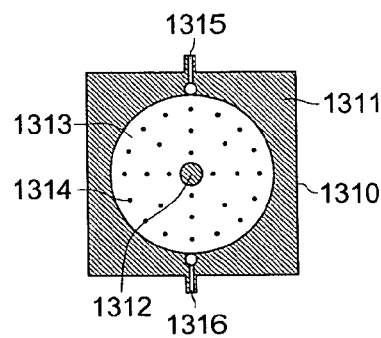

FIG. 14 (a) FIG. 14 (b) FIG. 14 (c)
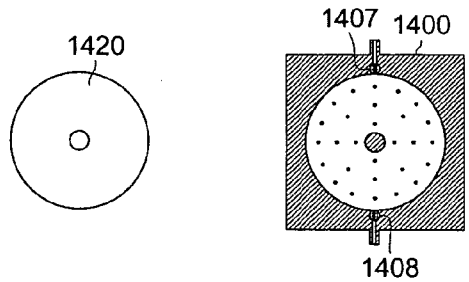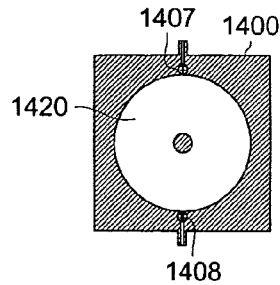
FIG. 14 (g)
FIG. 14 (d) FIG. 14 (e) FIG. 14 (f)
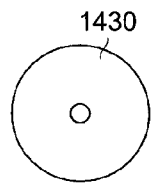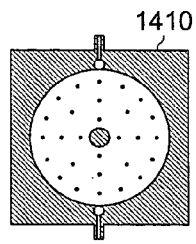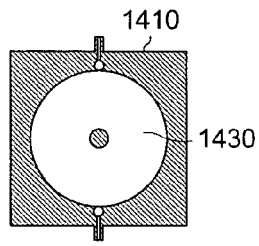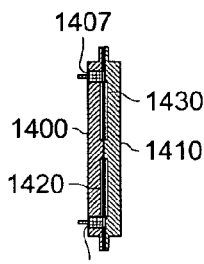
FIG. 15 (a) FIG. 15 (b) FIG. 15 (c) FIG. 15 (d)
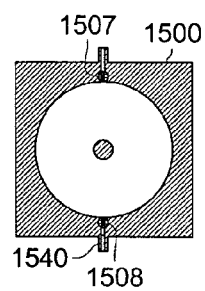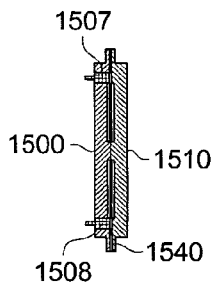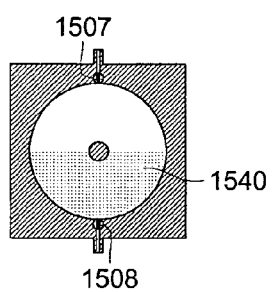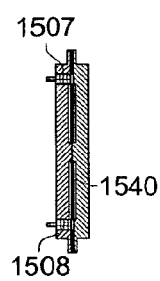
FIG. 15 (e) FIG. 15 (f) FIG. 15 (g) FIG. 15 (h)
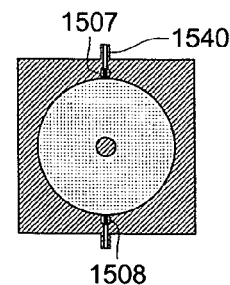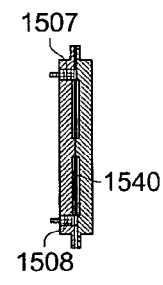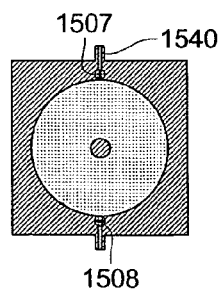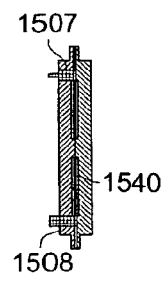

FIG. 16 (a)    FIG. 16 (b)    FIG. 16 (c)
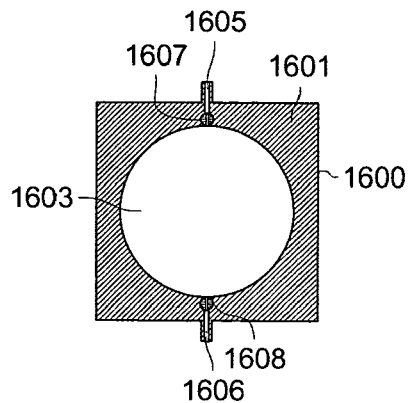 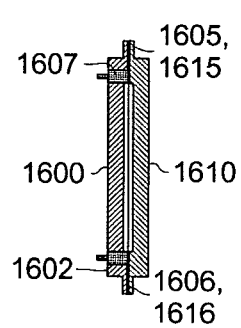 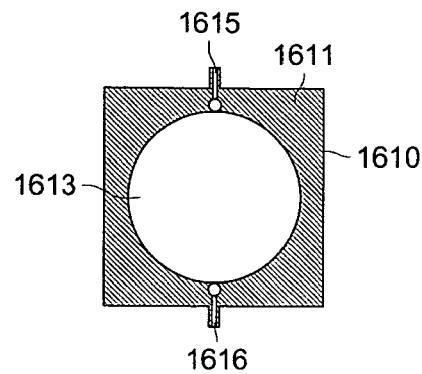
FIG. 17 (a)    FIG. 17 (b)    FIG. 17 (c)    FIG. 17 (d)
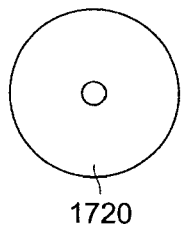 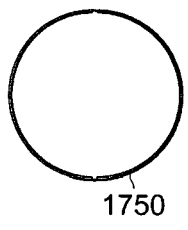 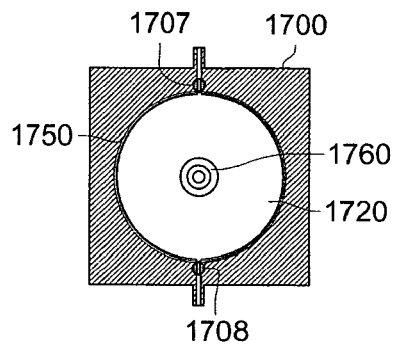
FIG. 17 (e)    FIG. 17 (f)    FIG. 17 (g)
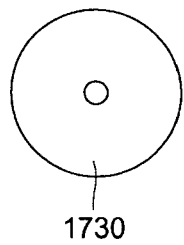 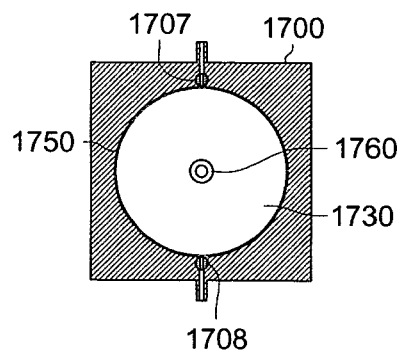 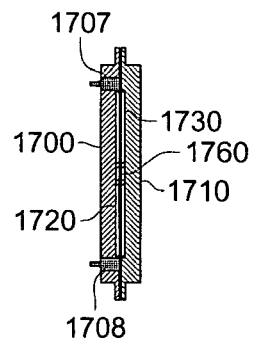

FIG. 27 ( a )
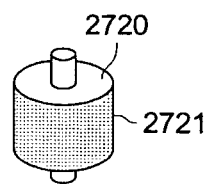
FIG. 27 ( b )
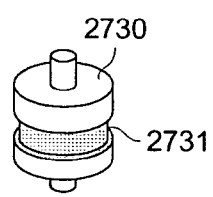
FIG. 27 ( c )
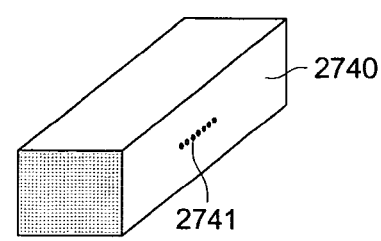
FIG. 27 ( d )
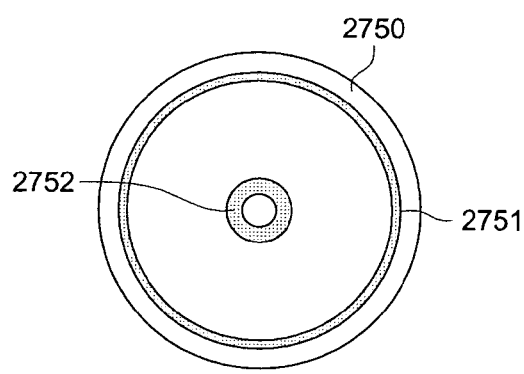
FIG. 27 ( e )
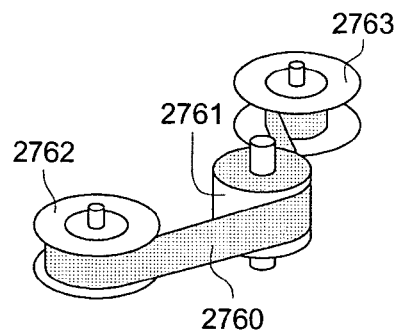

FIG. 28 (a)  FIG. 28 (b)  FIG. 28 (c)
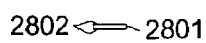
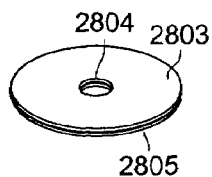
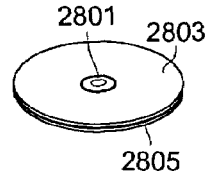
FIG. 28 (d)  FIG. 28 (e)
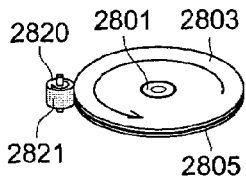
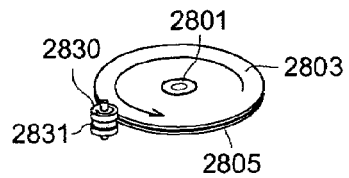
FIG. 28 (f)  FIG. 28 (g)
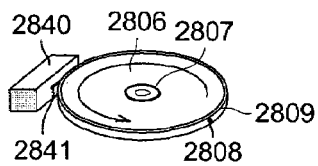
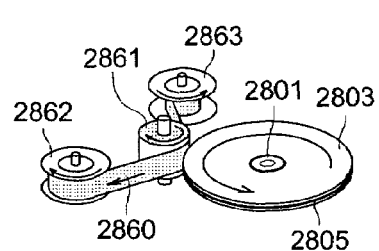
FIG. 28 (h)
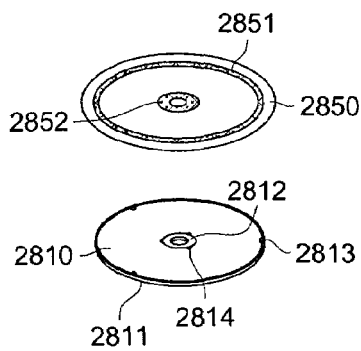
FIG. 28 (i)
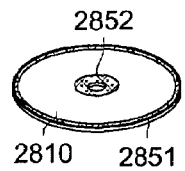
FIG. 29 (a)  FIG. 29 (b)  FIG. 29 (c)  FIG. 29 (d)  FIG. 29 (e)
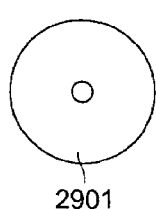
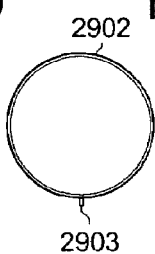
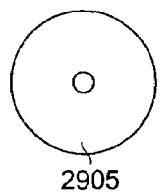
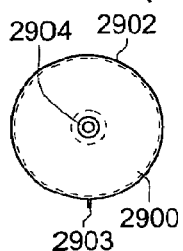

FIG. 30 ( a )
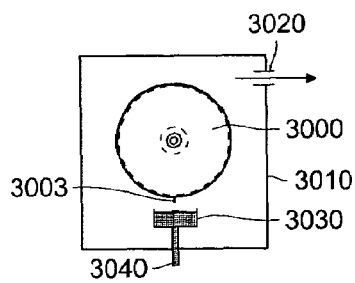
FIG. 30 ( b )
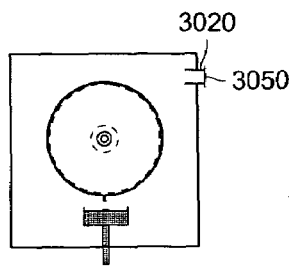
FIG. 30 ( c )
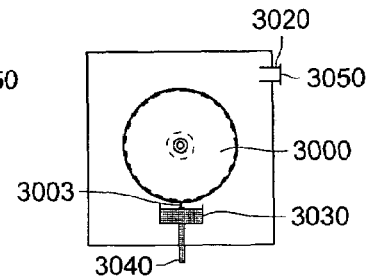
FIG. 30 ( d )
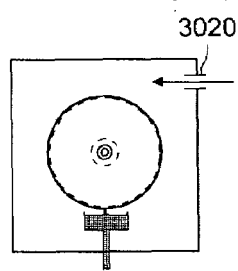
FIG. 30 ( e )
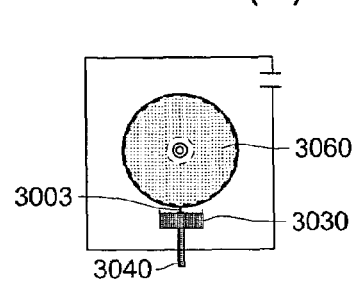
FIG. 30 ( f )
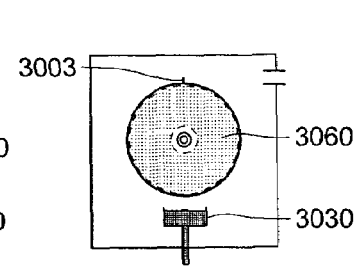
FIG. 31 ( a )
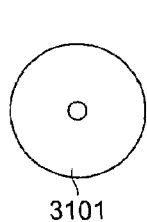
FIG. 31 ( b )
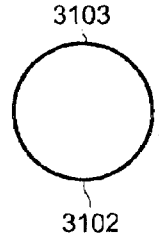
FIG. 31 ( c )
FIG. 31 ( d )
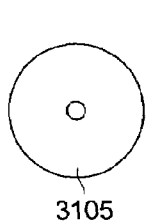
FIG. 31 ( e )
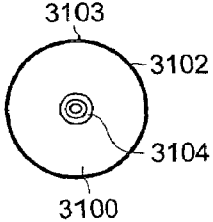
FIG. 32 ( a )
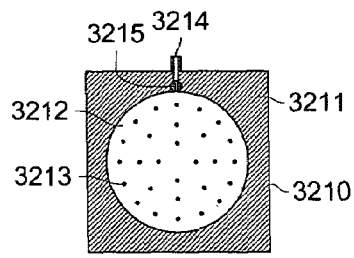
FIG. 32 ( b )
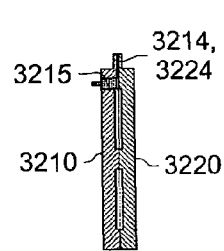
FIG. 32 ( c )
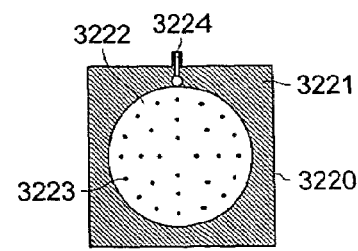

FIG. 35(a)  FIG. 35(b)  FIG. 35(c)
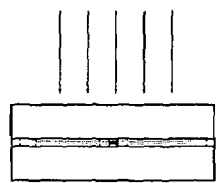 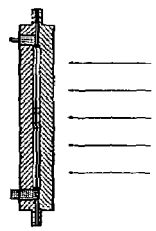 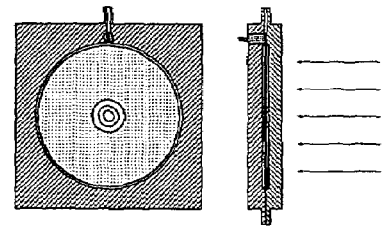
FIG. 35(d)  FIG. 35(e)
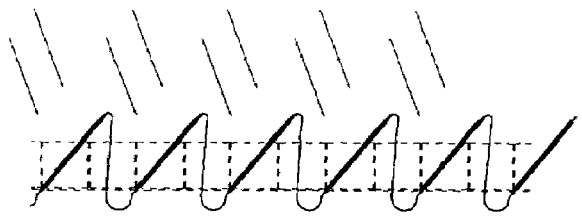 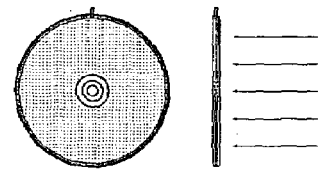
FIG. 36(a)  FIG. 36(b)
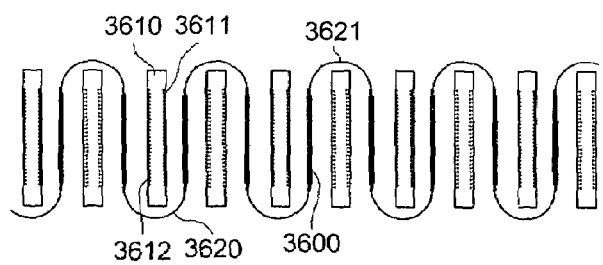 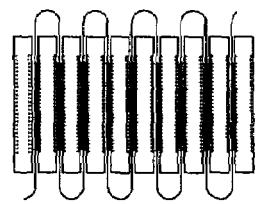
FIG. 36(c)  FIG. 36(d)
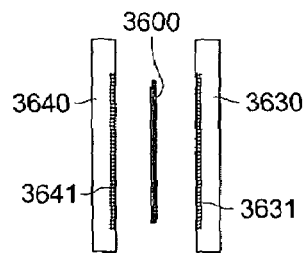 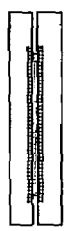

METHOD FOR PRODUCING HOLOGRAPHIC RECORDING MEDIUM

FIELD OF THE INVENTION

The present invention relates to a method for producing a holographic recording medium capable of having a great recording capacity.

BACKGROUND OF THE INVENTION

Recently, high speed and large capacity mutual data communication is increased accompanied with the spreading of internet and broad band communication. Moreover, the volume of data stored by government organs is rapidly enlarged with the expansion of the electronic governance promoted by Governments of many countries. Furthermore, it is expected that the needs for a photo-recording and reduction equipment and a recording medium having a high memory capacity is raised according to the spreading of high-vision and ground digital broadcasting.

Among the photo-recording-reproduction equipment having high memory capacity, a page memory system, particularly holographic recording-reproduction equipment, has been proposed as one instead of usual memory equipment. Such the equipment is noted since the system has randomly accessible high capacity memory. The holographic recording-reproduction equipment and the recording media to be used in such the equipment are described in some publications, for example, Hans J. Coufal et al. "Holographic Data Storage (Springer Series in Optical Sciences, Vol. 76)" Springer-Verlag GmbH & Co. KG, Aug. 2000.

As a holographic recording-reproduction system applied in the holographic recording-reproduction equipment, a recording-reproduction method using a holographic recording medium in which transparent substrates are arranged on both sides of a holographic recording layer such as that described in U.S. Pat. No. 5,719,691, and a recording-reproduction method using a holographic recording medium have been proposed, in which a reflective surface is arranged on one side of a holographic recording layer such as that described in Japanese Patent Publication Open to Public Inspection, hereinafter referred to as JP O.P.I. Publication, No. 2002-123949.

The holographic recording is based on the principal that the information is recorded by exposing the recording layer to holographic light for locally changing the refractive index of the recording layer, and the information is reproduced by reading the change of the refractive index in the recording layer. Various holographic recording layers are proposed, for example, one using inorganic substances such as those described in British Patent No. 9,929,953, one using substances capable of occurring structural isomerism by light such as those described in JP O.P.I. Publication No. 10-340479, and one utilizing the diffusion polymerization of photopolymer such as those described in U.S. Pat. Nos. 5,759,721 and 6,103,454. Among them, the materials using the photopolymer described in U.S. Pat. Nos. 5,759,721 and 6,103,454 have been actively investigated recently since such the material is high sensitive and the difference of the refractive index can be easily formed.

However, such the methods have a problems that the production process such as the spattering or the spin coating utilized for usual photo-recording media are difficultly applied for the holographic recording medium since the thickness of the recording layer of the holographic recording medium using the photopolymer is thicker compared with the usual photo-recording media such as CD-R, CD-RW, DVD-R, DVD-RW, DVD-RAM and DVD-ROM, and is usually more than 200 μm.

Moreover, in the photo-recording medium using the photopolymer, it is effective to raise the mobility of the compound in the recording layer for making the difference between the refractive index of the holographically exposed area and that of the unexposed area. However, when the mobility of the compound in the layer is raised, the medium shows a drawback such as that formation of the unevenness of thickness of the recording layer of the photo-recording medium is difficultly inhibited and that the portion having the different refractive index localized by the holographic exposure is easily moved in the recording layer.

For improving such the drawback, a method by arranging a supplemental member between the substrates constituting the recording medium is proposed, for example, in U.S. patent application Ser. No. 2002/0145772. Such the method tends to be insufficient for preventing the difference of layer thickness between each of the recording media even though the method is effective for preventing the positional discrepancy of the substrates.

SUMMARY OF THE INVENTION

The object of the invention is to provide a method for producing holographic recording media with small deformation and high uniformity.

(1) An embodiment of the invention for attaining the above object of the invention is a method for producing a holographic recording medium having a holographic recording layer between a first substrate and a second substrate in which the following processes are successively performed, a first recording layer forming composition providing process for providing a holographic recording layer forming composition onto the first substrate, a holographic recording layer forming process for forming a the holographic recording layer between the first substrate and the second substrate by facing the second substrate to the first substrate, and a hardening process for hardening the holographic recording layer by heat or light.

(2) The method for producing the holographic recording medium of the invention described in (1), wherein the method comprises a second recording layer forming composition providing process for providing the holographic recording layer forming composition onto the second substrate and a process for forming the holographic recording layer between the first substrate and the second substrate by facing the face of the first substrate on which the holographic recording layer forming composition is provided and the face of the second substrate on which the holographic recording layer forming composition is provided.

(3) The method for producing the holographic recording medium of the invention described in (1) or (2), wherein a first space retaining means is provided for retaining a designated space between the first substrate and the second substrate on the occasion of the facing the second substrate and the first substrate. (4) The method for producing the holographic recording medium of the invention described in any one of (1) through (3), wherein the method comprises a substrate holding process for holding the first substrate by the first substrate holding means or the second substrate by the second substrate holding means, and a process for forming the holographic recording layer between the first substrate held by the first substrate holding means and the second substrate held by the second substrate holding means by facing the second substrate holding means to the first substrate holding means.

(5) The method for producing the holographic recording medium of the invention described in (4), wherein the first substrate and the first substrate holding means are contacted by vacuum in the substrate holding process.

(6) The method for producing the holographic recording medium of the invention described in (4) or (5), wherein the second substrate and the second substrate holding means are contacted by vacuum in the substrate holding process.

(7) The method for producing the holographic recording medium of the invention described in any one of (4) through (6), wherein a second space retaining means is provided for retaining the designated space between the first substrate holding means and the second substrate holding means on the occasion of facing the first substrate holding means to the second substrate holding means.

(8) The method for producing the holographic recording medium of the invention described in any one of (1) through (7), wherein a removing means is provided for removing the holographic recording layer forming composition forced out from the area of facing the first substrate to the second substrate.

(9) The method for producing the holographic recording medium of the invention described in any one of (1) through (8), wherein the method comprises a cutting process for cutting the holographic recording medium after the hardening process into a designated size.

(10) The method for producing the holographic recording medium of the invention described in any one of (1) through (9), wherein the method comprises a sealing process for sealing the bare portion of the holographic recording layer.

(11) The method for producing the holographic recording medium of the invention described in any one of (1) through (10), wherein a composition exhausting portion for exhausting the holographic recording layer forming composition to outside of the facing area of the first substrate and the second substrate is provided at least one of the first substrate and the second substrate.

(12) The method for producing the holographic recording medium of the invention described in any one of (3) through (11), wherein the composition exhausting portion for exhausting the holographic layer forming composition to outside of the facing area of the first substrate and the second substrate is provided at the first space retaining means.

(13) The method for producing the holographic recording medium of the invention described in any one of (1) through (12), wherein the first recording layer forming composition providing process and the holographic recording layer forming process are performed under a reduced pressure.

(14) The method for producing the holographic recording medium of the invention described in any one of (1) through (13), wherein the method comprises a bubble removing process for removing a bubble included in the holographic recording layer formed by the holographic recording layer forming process.

(15) The method for producing the holographic recording medium of the invention described in any one of (1) through (14), wherein the holographic recording medium satisfies the relation of $0.15 \leq Dh/(D1+D2) \leq 2.0$ wherein $D1$ is the thickness of the first substrate, $D2$ is the thickness of the second substrate and $Dh$ is the thickness of the holographic recording medium.

(16) The method for producing the holographic recording medium of the invention described in (15), wherein the thickness of the holographic recording layer $Dh$ is from 200 µm to 2.0 mm.

(17) The method for producing the holographic recording medium of the invention described in (15), wherein the relation of the thickness of the first substrate $D1$ and the thickness of the second substrate $D2$ is $D1 \leq D2$.

(18) The method for producing the holographic recording medium of the invention described in any one of (1) through (17), wherein the first substrate is transparent and subjected to an anti-reflection treatment on the side opposite to the side on which the holographic recording layer is provided.

(19) The method for producing the holographic recording medium of the invention described in any one of (1) through (18), wherein, the material of the first substrate is glass.

(20) The method for producing the holographic recording medium of the invention described in any one of (1) through (19), wherein a reflective layer having a reflectance of not less than 70% is provided on the face of the second substrate on which the holographic recording layer to be provided or the face opposite thereto.

(21) The method for producing the holographic recording medium of the invention described in any one of (1) through (20), wherein the shape of the holographic recording medium is a disc.

(22) The method for producing the holographic recording medium of the invention described in any one of (1) through (21), wherein the shape of the holographic recording medium is a card.

(23) An embodiment of the invention is a method for producing a holographic recording medium having a holographic recording layer between a first substrate and a second substrate in which the following processes are successively performed, a space forming process for forming a space between the first substrate and the second substrate having at least one opening through which the holographic recording layer forming composition is charged into the space by holding the first substrate and the second substrate so the designated distance is retained between the substrates, a recording layer forming composition charging process for charging the holographic recording layer composition into the space through the at least one opening to form the holographic recording layer, and a hardening process for hardening the holographic recording layer by heat or light.

(24) The method for producing the holographic recording medium of the invention described in (23), wherein the holographic recording layer forming composition is charged into the space by injecting the composition through the opening.

(25) The method for producing the holographic recording medium of the invention described in any one of (23) or (24), wherein the opening has an injection portion through which the holographic recording layer forming composition is injected into the space and a exhausting portion through which the holographic recording layer forming composition is exhausted from the space, and the holographic recording layer forming composition is charged into the space by sucking air through the exhausting portion in the holographic recording layer forming composition charging process.

(26) The method for producing the holographic recording medium of the invention described in any one of (23) through (25), wherein a first space retaining means is provided for holding the first substrate and the second substrate so as to retain the designated distance between the first and second substrates.

(27) The method for producing the holographic recording medium of the invention described in any one of (23) through (26), wherein the method comprises a substrate holding process for folding the first substrate by a first substrate holding means and/or folding the second substrate by a second substrate holding means, and the first substrate and the second substrate are faced to each other so as to retain the designate distance between the first substrate and the second substrate and the space having at least one opening for charging the holographic recording layer forming composition in the space forming process.

(28) The method for producing the holographic recording medium of the invention described in (27), wherein the first substrate and the first substrate holding means are contacted by vacuum in the substrate holding process.

(29) The method for producing the holographic recording medium of the invention described in any one of (27) through (28), wherein the second substrate and the second substrate holding means are contacted by vacuum in the substrate holding process.

(30) The method for producing the holographic recording medium of the invention described in any one of (27) through (29), wherein a second space retaining means is provided for retaining a designated space between the first substrate holding means and the second substrate holding means on the occasion of facing the first substrate holding means to the second substrate holding means.

(31) The method for producing the holographic recording medium of the invention described in any one of (23) through (30), wherein a removing means is provided for removing the holographic recording layer forming composition forced out from the area of facing the first substrate to the second substrate.

(32) The method for producing the holographic recording medium of the invention described in any one of (23) through (31), wherein the method comprises a cutting process for cutting the holographic recording medium after the hardening process into a designated size.

(33) The method for producing the holographic recording medium of the invention described in any one of (23) through (32), wherein the method comprises a sealing process for sealing the bare portion of the holographic recording layer.

(34) The method for producing the holographic recording medium of the invention described in any one of (23) through (33), wherein a holographic recording layer forming composition charging portion for charging the holographic recording layer forming composition into the space and a holographic recording layer forming composition exhausting portion for exhausting the holographic recording layer forming composition from the space are provided on at least one of the first substrate and the second substrate.

(35) The method for producing the holographic recording medium of the invention described in any one of (23) through (34), wherein a holographic recording layer forming composition charging portion for charging the holographic recording layer forming composition into the space and a holographic recording layer forming composition exhausting portion for exhausting the holographic recording layer forming composition from the space are provided on on the first space retaining means.

(36) The method for producing the holographic recording medium of the invention described in any one of (23) through (35), wherein the recording layer forming composition charging process is performed under a reduced pressure.

(37) The method for producing the holographic recording medium of the invention described in any one of (23) through (36), wherein the method comprises a bubble removing process for removing a bubble included in the holographic recording layer formed by the holographic recording layer forming process.

(38) The method for producing the holographic recording medium of the invention described in any one of (23) through (37), wherein the holographic recording medium satisfies the relation of $0.15 \leq Dh/(D1+D2) \leq 2.0$ wherein $D1$ is the thickness of the first substrate, $D2$ is the thickness of the second substrate and $Dh$ is the thickness of the holographic recording medium.

(39) The method for producing the holographic recording medium of the invention described in (38), wherein the thickness of the holographic recording layer $Dh$ is from 200 μm to 2.0 mm.

(40) The method for producing the holographic recording medium of the invention described in (38) or (39), wherein the relation of the thickness of the first substrate $D1$ and the thickness of the second substrate $D2$ is $D1 \leq D2$.

(41) The method for producing the holographic recording medium of the invention described in any one of (23) through (40), wherein the first substrate is transparent and subjected to an anti-reflection treatment on the side opposite to the side on which the holographic recording layer is provided.

(42) The method for producing the holographic recording medium of the invention described in any one of (23) through (41), wherein, the material of the first substrate is glass.

(43) The method for producing the holographic recording medium of the invention described in any one of (23) through (42), wherein a reflective layer having a reflectance of not less than 70% is provided on the face of the second substrate on which the holographic recording layer to be provided or the face opposite thereto.

(44) The method for producing the holographic recording medium of the invention described in any one of (23) through (43), wherein the shape of the holographic recording medium is a disc.

(45) The method for producing the holographic recording medium of the invention described in any one of (23) through (44), wherein the shape of the holographic recording medium is a card.

(46) An embodiment of the invention is a method for producing the holographic recording medium having a holographic recording layer between a first substrate and a second substrate in which the following processes are successively performed, a space forming process for forming a space between the first substrate and the second substrate having at least one opening through which the holographic recording layer forming composition is charged into the space by holding the first substrate and the second substrate so the designated distance is retained between the substrates, 'a pressure reducing process for reducing pressure in the space by a pressure controlling means, a recording layer forming process in which the holographic recording layer is formed by charging the holographic recording layer forming composition into the space through at least one of the opening by restoring the pressure in the space to the original pressure by the pressure controlling means, and a hardening process for hardening the holographic recording layer by heat or light.

(47) The method for producing the holographic recording medium of the invention described in (46), wherein the opening is immersed in the holographic recording layer forming composition and then the holographic recording layer forming composition is charged into the space through the opening by restoring the pressure in the space reduced in the pressure reducing process by the pressure controlling means.

(48) The method for producing the holographic recording medium of the invention described in (46), wherein the holographic recording layer forming composition is charged into the space while the reduced pressure in the space is maintained.

(49) The method for producing the holographic recording medium of the invention described in any one of (46) through (48), wherein the method comprises a substrate holding process for holding the first substrate by the first substrate holding means or the second substrate by the second substrate holding means, and in the space forming process, the first substrate and the second substrate are each held so as that the distance between the first substrate and the second substrate is made to a designated distance and the space having at least one opening for charging the holographic recording layer forming composition between the first substrate and the second substrate is formed by facing the second substrate holding means to the first substrate holding means.

(50) The method for producing the holographic recording medium of the invention described in (49), wherein the first substrate and the first substrate holding means are contacted by vacuum in the substrate holding process.

(51) The method for producing the holographic recording medium of the invention described in (49), wherein the second substrate and the second substrate holding means are contacted by vacuum in the substrate holding process.

(52) The method for producing the holographic recording medium of the invention described in (49) through (51), wherein a second space retaining means is provided for retaining a designated space between the first substrate and the second substrate on the occasion of the facing the second substrate and the first substrate.

(53) The method for producing the holographic recording medium of the invention described in any one of (46) through (52), wherein a removing means is provided for removing the holographic recording layer forming composition forced out from the area of facing the first substrate to the second substrate.

(54) The method for producing the holographic recording medium of the invention described in any one of (46) through (53), wherein the method comprises a cutting process for cutting the holographic recording medium into a designated size after the hardening process.

(55) The method for producing the holographic recording medium of the invention described in any one of (46) through (53), wherein the method comprises a sealing process for sealing the bare portion of the holographic recording layer.

(56) The method for producing the holographic recording medium of the invention described in any one of (46) through (55), wherein the holographic recording medium satisfies the relation of $0.15 \leq Dh/(D1+D2) \leq 2.0$ wherein D1 is the thickness of the first substrate, D2 is the thickness of the second substrate and Dh is the thickness of the holographic recording medium.

(57) The method for producing the holographic recording medium of the invention described in (56), wherein the thickness of the holographic recording layer Dh is from 200 µm to 2.0 mm.

(58) The method for producing the holographic recording medium of the invention described in (56) or (57), wherein the relation of the thickness of the first substrate D1 and the thickness of the second substrate D2 is $D1 \leq D2$.

(59) The method for producing the holographic recording medium of the invention described in any one of (46) through (58), wherein the first substrate is transparent and subjected to an ant-reflection treatment on the side opposite to the side on which the holographic recording layer is provided.

(60) The method for producing the holographic recording medium of the invention described in any one of (46) through (59), wherein, the material of the first substrate is glass.

(61) The method for producing the holographic recording medium of the invention described in any one of (46) through (60), wherein a reflective layer having a reflectance of not less than 70% is provided on the face of the second substrate on which the holographic recording layer to be provided or the face opposite thereto.

(62) The method for producing the holographic recording medium of the invention described in any one of (46) through (61), wherein the shape of the holographic recording medium is a disc.

(63) The method for producing the holographic recording medium of the invention described in any one of (46) through (62), wherein the shape of the holographic recording medium is a card.

(64) The method for producing the holographic recording medium of the invention described in any one of (46) through (63), wherein the method comprises a bubble removing process for removing a bubble included in the holographic recording layer formed by the holographic recording layer forming process.

BRIEF DESCRIPTION OF THE DRAWINGS

FIGS. 1(a) through 1(d) show schematic drawings describing the usual production method of a holographic recording medium.

FIGS. 2(a) through 2(d) show schematic drawings describing the first embodiment of the production method according to the invention of a holographic recording medium.

FIGS. 4(a) through 4(k) show schematic drawings describing the first embodiment of the production method according to the invention of a holographic recording medium.

FIG. 5 shows the cross section of the substrate piled with the substrate holding means shown in FIGS. 3(a) through 3(j) of the first embodiment of the holographic recording medium producing method according to the invention.

FIG. 6 shows the cross section of the substrate piled with the substrate holding means shown in FIGS. 4(a) through 4(k) of the first embodiment of the holographic recording medium producing method according to the invention.

FIG. 7 shows the plan view of the upper side of the means for retaining the distance from the outer side of the disc-shaped first substrate to the outer side of the second substrate at the designated value in the first embodiment of the holographic recording medium producing method according to the invention.

FIGS. 8(a) through 8(e) show the enlarged drawing of a part of the means shown in FIG. 7 in the first embodiment of the holographic recording medium producing method according to the invention.

FIGS. 12(a) through 12(e) show the drawings describing the first embodiment of the holographic recording medium producing method according to the invention.

FIGS. 13(a) through 13(c) show the drawings describing the second embodiment of the holographic recording medium producing method according to the invention.

FIGS. 14(a) through 14(g) show the drawings describing the second embodiment of the holographic recording medium producing method according to the invention.

FIGS. 15(a) through 15(h) show the drawings describing the second embodiment of the holographic recording medium producing method according to the invention.

FIGS. 16(a) through 16(c) show the drawings describing the second embodiment of the holographic recording medium producing method according to the invention.

FIGS. 17(a) through 17(g) show drawings describing the situation in which each of the substrates is contacted to the face of the corresponding substrate holding means for holding the substrate and the substrate holding means are pile by pressure with together.

FIGS. 27(a) and 27(e) show an example of tool for sealing the bare portion of the holographic recording layer.

FIGS. 28(a) through 28(i) show the concrete sealing procedure using the sealing tool and the sealing material.

FIGS. 29(a) through 29(e) show the structure of recording medium without holographic recording layer forming composition which is constituted by the first and second substrates held between the space retaining means.

FIGS. 30(a) through 30(f) show the drawings describing the third embodiment of the holographic recording medium producing method according to the invention.

FIGS. 31(a) through 31(e) show the structure of recording medium without holographic recording layer forming composition which is constituted by the first and second substrates held between the space retaining means.

FIGS. 32(a) through 32(c) show the substrate holding means.

FIGS. 35(a) through 35(e) show the hardening method by uniformly irradiating light to the recording medium.

FIGS. 36(a) through 36(d) show the hardening method by a heating treatment.

The Best Embodiment of the Invention

Figure 3A:
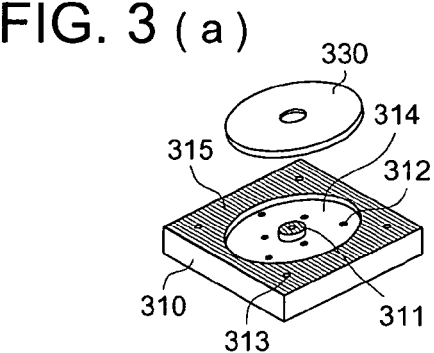
FIGS. 3(a) through 3(j) show schematic drawings describing the first embodiment of the production method according to the invention of a holographic recording medium.

The embodiments of the invention are described in detail below referring FIGS. 1 through 36.

FIGS. 1(a) through 1(d) are schematic drawings describing the usual production method of a holographic recording medium.

Generally, holographic recording medium is prepared by the following procedure: a holographic recording layer forming composition 102 is provided on a first substrate 101 shown in FIG. 1(a) and pasted with a second substrate 103 shown in FIG. 1(c) to prepare a holographic recording medium 100 in which the first substrate shown in FIG. 1(d), the holographic recording layer and the second substrate are piled in this order. However, degradation of the uniformity of the thickness of the recording layer of individual recording medium or the fluctuation of the recording layer thickness of every recording media tends to occur, even though some countermeasure are proposed, since the recording layer of such the recording medium is thicker than that of usual recording media.

DETAILED DESCRIPTION OF PREFERRED EMBODIMENTS

The First Embodiment of the Invention

FIGS. 2(a) through 2(d), FIGS. 3(a) through 3(j) and FIGS. 4(a) through 4(k) are all drawings describing the first embodiment of the production method of holographic recording medium according to the invention. First, FIGS. 2(a) through 2(d) and FIGS. 3(a) through 3(j) are described.

In FIGS. 2(a) through 2(d), 201 is a first substrate holding means, 220 is a second substrate holding means, 230 is a first substrate, 240 is a second substrate, 211 is a space retaining means (the second space retaining means) for keeping the space between the first substrate holding means 210 and the second substrate holding means 220, 214 is a dent fitting with the shape of the first substrate 230, 212 is a suction opening for contacting the first substrate 230 to the dent 214, 215 is the face to be contacted with the second substrate holding means 220, 213 is a dent for position adjusting of the first substrate holding means and the second substrate holding means, 221 and 223 are projections for position adjusting of the first substrate holding means and the second substrate holding means, 224 is a projection fitting with the shape of the second substrate 240, 222 is a suction opening for contacting the second substrate 240 to the projection 224, 225 is the face to be contacted to the first substrate holding means 210, and 241 and 242 are each a exhausting portion for exhausting excessive recording layer forming composition which are also effective as the space forming means for forming a designated space between the first substrate holding means 210 and the second substrate holding means 220 when they are combined. FIG. 2(a) is a front view of the first substrate holding means, FIG. 2(b) is a front view of the second substrate holding means, and FIG. 2(c) and FIG. 2(d) are each a plan view of the first substrate 230 and the second substrate 240.

In FIGS. 3(a) through 3(j), 310 is a first substrate holding means, 320 is a second substrate holding means, 330 is a first substrate, 340 is a second substrate, 311 is a space retaining means for retaining the space between the first substrate holding means 410 and the second substrate holding means 320, 314 is a dent fitting with the shape of the first substrate 330, 321 is a suction opening for contacting the first substrate 330 to the dent 314, 315 is the face to be contacted with the second substrate holding means, 313 is a dent for position adjusting of the first substrate holding means and the second substrate holding means, 321 and 323 are each a projection for position adjusting of the first substrate holding means and the second substrate holding means, 324 is a projection fitting with the shape of the second substrate 340, 322 is a suction opening for contacting the second substrate 340 to the projection 324, 325 is the face to be contacted to the first substrate holding means 310, 341 and 342 are a exhausting portion for exhausting excessive recording layer forming composition and 350 and 351 represent the holographic recording layer forming composition.

Figure 3B:
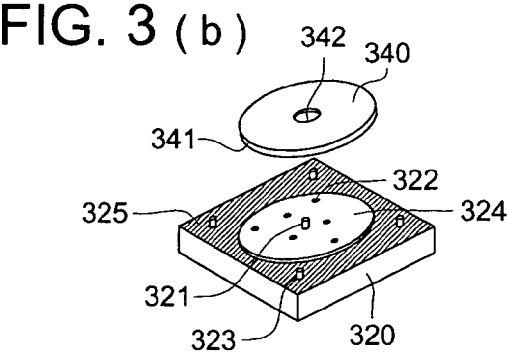
Figure 3C:
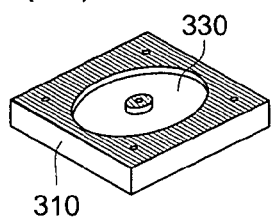
Figure 3D:
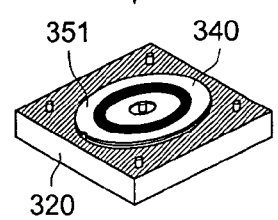
Figure 3E:
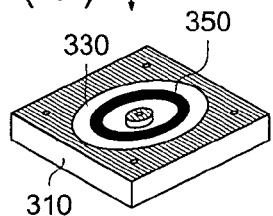
Figure 3F:
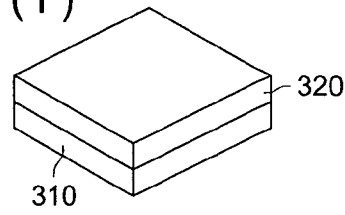
Figure 3G:
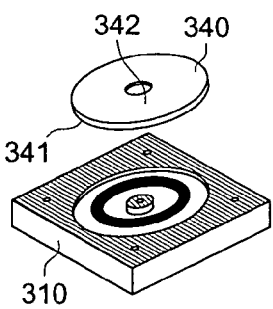
Figure 3I:
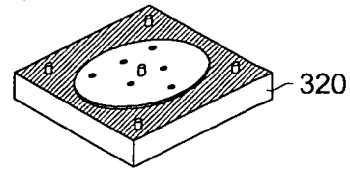
Figure 3H:
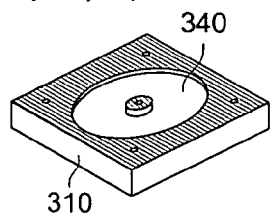
Figure 3J:
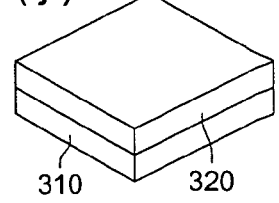

First, the first substrate holding means 310 and the first substrate 330 are prepared as shown in FIG. 3(a) and the first substrate 330 is put into the dent 314 having the shape fitting with that of the first substrate as shown in FIG. 3(b). It is preferred on this occasion that the first substrate 330 is contacted to the dint 314 by sucking through the suction opening 312 for reducing the unevenness of the holographic recording layer thickness. Then the holographic recording layer forming composition 350 is coated on the first substrate by a recording layer forming composition providing means as shown in FIG. 3(c). Besides, the second substrate holding means 320 and the second substrate are prepared as shown in FIG. 3(d), and the second substrate is contacted to the dent 324 by sucking through the suction opening 322 as shown in FIG. 3(e). Then the holographic recording layer forming composition 351 is coated on the first substrate by the recording layer forming composition providing means. Lastly, the first substrate and the second substrate, on each of which the holographic recording layer forming composition are coated, are piled and pressed as shown in FIG. 3(f). Thus, the recording medium having the holographic recording layer of designated thickness can be produced. FIG. 3(g) shows the method for directly piling the second substrate to the first substrate coated with the holographic recording layer forming composition 350 by the recording layer forming composition providing means shown in FIG. 3(c). FIG. 3(h) shows the piled state of the second substrate 340 and the first substrate coated with the recording layer forming composition 350, and FIG. 3(j) shows the method by which the second substrate holding means 320 shown in FIG. 3(i) is piled and pressed to produce the recording medium with the holographic recording layer having the designated thickness. For inhibiting the fluctuation of the recording layer thickness while maintaining the uniformity of the whole thickness of any portion of the medium, it is preferable that the second substrate is contacted to the projection 324 for position adjusting to the second substrate holding means by sucking through the suction opening 332 formed on the second substrate holding means 320 shown in FIG. 3(j). Furthermore, the fluctuation of the layer thickness between individual recording media can be reduced since the substrate holding means commonly can be used.

As the recording layer forming composition providing means, any methods capable of coating the recording layer forming composition on the substrate can be applied without any limitation. Known coating methods such as direct drip coating, brush coating, coating by a coating station such as a roller coater, coating by an ink-jet nozzle or gravure coating can be optionally applied.

The production method using the substrate holding means each fitted to the shape of the first and second substrate, respectively, is described referring FIGS. 3(a) through 3(j), and an example of the method using substrate holding means having the shape different from that of the substrate is described in FIGS. 4(a) through 4(k). In FIGS. 4(a) through 4(k), 410 is a first substrate holding means, 420 is a second substrate holding means, 430 is a first substrate, 440 is a second substrate, 450 is a holographic recording layer forming composition, 411 is a space retaining means for retaining the designated space on the occasion of contacting with the second substrate holding means, 412 is a suction opening for contacting the first substrate, 413 is a portion to be contacted to the first substrate, 414 is a exhausting means for exhausting the composition when the excessive composition is brought, 421 is a space retaining means for retaining the designated space on the occasion of contacting with the first substrate holding means, 422 is a suction opening for contacting the second substrate, and FIGS. 4(a) and 4(b) each show the first substrate and the first substrate holding means and FIGS. 4(g) and 4(h) each shows the second substrate and the second substrate holding means, respectively.

Firstly, the first substrate 340 is contacted by vacuum with the first substrate holding means 410 by sucking through the suction opening 412 as shown in FIGS. 4(c) and 4(d). FIG. 4(c) is a plan view from the upper viewpoint and FIG. 4(d) is a plan view from the side viewpoint. In such the state, the holographic recording layer forming composition 450 is coated onto the first substrate contacted by vacuum to the first substrate holding means by the recording layer composition providing means as shown in FIGS. 4(e) and 4(f), on which the second substrate 440 contacted by vacuum to the second substrate holding means 420 by sucking through the suction opening 422 as shown in FIGS. 4(i) and 4(j) is piled and pressed. Thus the recording media can be produced which have each a uniform whole thickness at any portion thereof and the uniform designated thickness of the recording layer. Moreover, the fluctuation of the layer thickness between the individual recording media can be reduced since the substrate holding means commonly can be used.

FIG. 5 shows the cross section of the substrate and the substrate holding means shown in FIGS. 3(a) through 3(j) in the piled state, and FIG. 6 shows the cross section of the substrate and the substrate holding means shown in FIGS. 4(*a*) through 4(*k*) in the piled state.

As is cleared in FIG. 5, in the production method shown by FIGS. 3(*a*) through 3(*j*), it is preferable that the recording layer forming composition is coated in the same or a slightly excessive amount to the amount to be charged into the space and the composition has low viscosity since the capacity of the exhausting means is small in the substrate holding means.

In the method shown by FIGS. 4(*a*) through 4(*k*), the substrate holding means has large capacity for receiving the excessive recording layer forming composition, accordingly it is preferable that the composition is coated in an excessive amount, and the recording medium can be produced even when the composition has high viscosity.

Next, the producing method is described in which the holographic recording medium using the space retaining means for holding the first and second substrates so as to retain the designated space between each of the substrates.

Figures 9A, 9B, 9C:
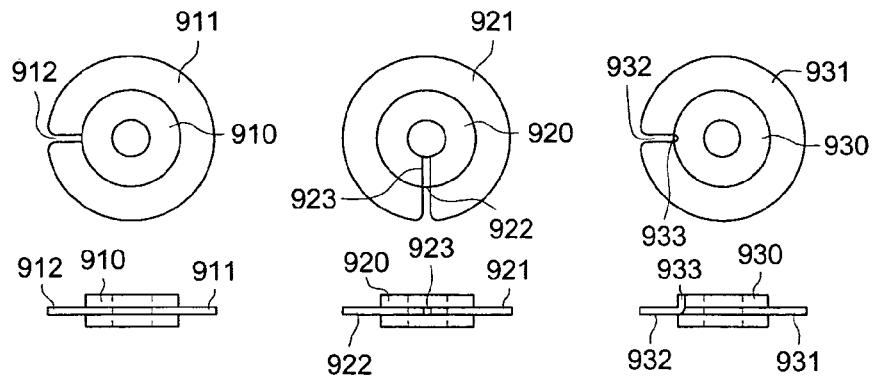
FIGS. 9(a) through 9(e) show the means for retaining the distance from the inner side of the first substrate to the inner side of the second substrate at the designated value in the first embodiment of the holographic recording medium producing method according to the invention.
Figures 9D, 9E:
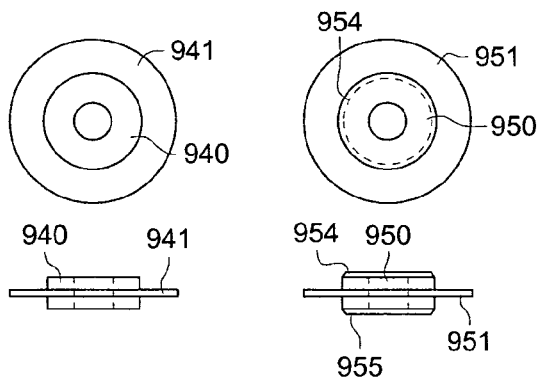

The space retaining means (the first space retaining means) to be used in the production method according to the invention is described in detail referring FIG. 7, FIGS. 8(*a*) through 8(*e*) and FIGS. 9(*a*) through 9(*e*).

FIG. 7 is a plan view from the upper viewpoint of the means for retaining the distance between the outer side of shaped substrate disc and that of the second substrate disc at the designated value, and the space retaining means 760 has a space keeping means 710.

FIGS. 8(*a*) through 8(*e*) show the enlarged drawings of a part of the means shown by FIG. 7. In the drawings, some shapes of the means are shown. However, the shape is not limited to those described below.

In FIGS. 8(*a*) through 8(*e*), the drawings shown in the upper line are each the plan view from the upper viewpoint, those shown in the intermediate line are plan view from the inside viewpoint and those shown in the lower line are the cross section from the side viewpoint. In the drawings, 810, 820, 830, 840 and 850 are each a portion for retaining the designated distance between the outer side of the first substrate and that of the second substrate, 811, 821, 831, 941 and 851 are each a face to be contacted to the first substrate, 812, 822, 832, 842 and 825 are each a face to be contacted to the second substrate, 823, 824, 834, 844, 845 and 855 are each a portion for exhausting the excessive recording layer forming composition, 856 is a claw for contacting the first substrate to the portion 851 of the space retaining means to be contacted to the substrate, and 857 is a claw for contacting the second substrate to the portion 852 of the space retaining means to be contacted to the substrate.

FIGS. 9(*a*) through 9(*e*) show means for retaining the distance between the inner side of the first substrate and that of the second substrate. In FIGS. 9(*a*) through 9(*e*), the drawing in the upper line are the plan view from the upper viewpoint, those in the lower line are cross section from the side viewpoint. In the drawings, 910, 920, 930, 940 and 950 are each a space retaining means, 911, 921, 931, 941 and 951 are each a space retaining means for retaining the distance between the inner side of the first substrate and that of the second substrate at the designated value, 912, 922, 923, 932 and 933 are each a portion for exhausting the excessive recording layer forming composition and the 954 and 955 are each a claw for contacting the first substrate and the second substrate to the space retaining means. The shape of the means for retaining the distance between the inner side of the first substrate and that of the second substrate at the designated value to produce the disc-shaped recording medium is not limited to the shapes shown in the drawings as long as the space retaining means can attain the object of the invention.

Figure 10A:
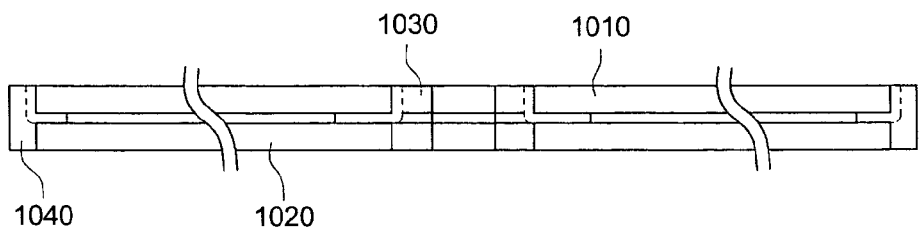
FIGS. 10(a) and 10(b) show the cross section of the combination of the first space retaining means, the first substrate and the second substrate in the first embodiment of the holographic recording medium producing method according to the invention.
Figure 10B:
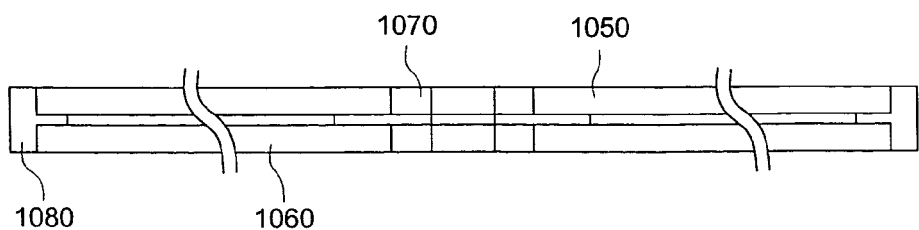

FIGS. 10(*a*) and 10(*b*) show each the cross section of the space retaining means, the first substrate and the second substrate in the assembled state shown in FIGS. 8(*a*) through 8(*e*) and FIGS. 9(*a*) through 9(*e*). In FIGS. 10(*a*) and 10(*b*), 1040 and 1080 are each a means for retaining the distance between the outer side of the first substrate and that of the second substrates, 1030 and 1070 are each a means for retaining the distance between the inner side of the first substrate and that of the second substrate, 1010 and 1050 are each a first substrate, and 1020 and 1060 are each a second substrate.

An example of the production method is described below referring the FIGS. 11(*a*) through 11(*h*) in which the above-described space retaining means is used.

Figure 11:
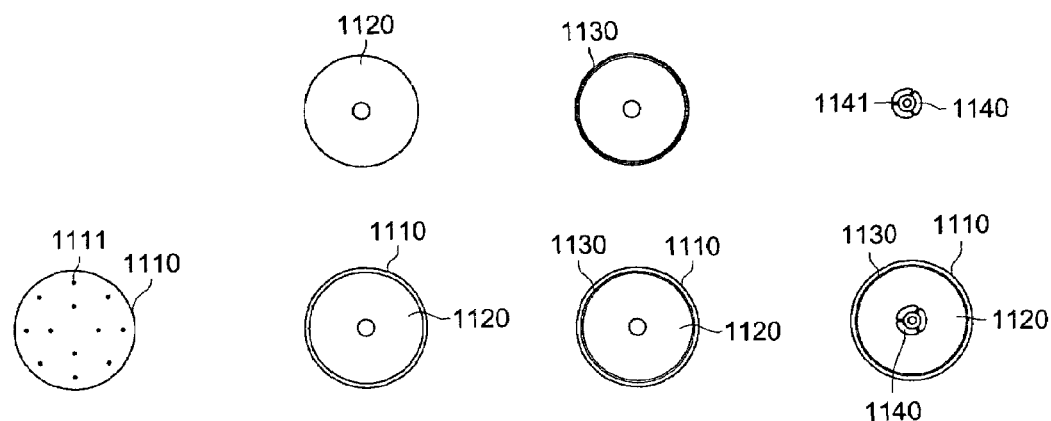
FIGS. 11(a) through 11(h) show the drawings describing the first embodiment of the holographic recording medium producing method according to the invention.
Figure 11:
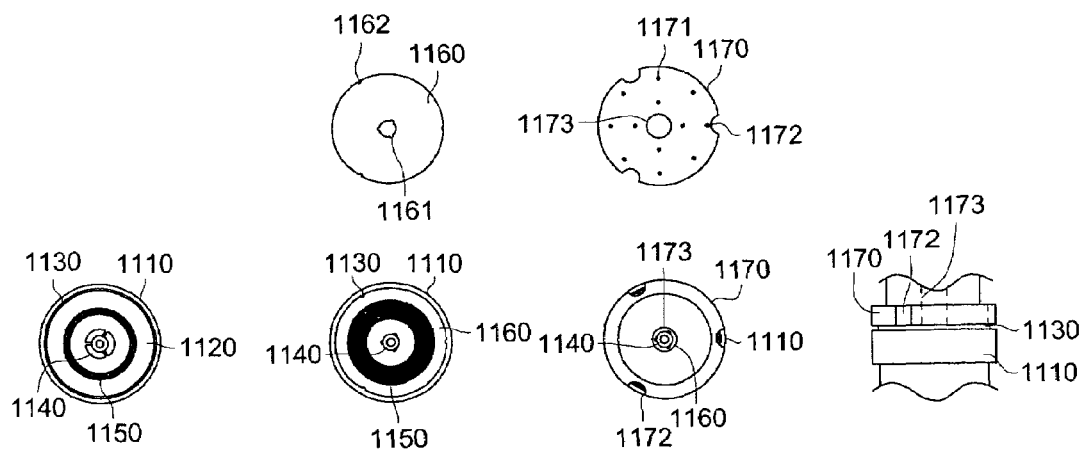

In FIGS. 11(*a*) through 11(*h*), 1110 is a first substrate holding means, 1111 is a suction opening for contacting the first substrate to the first substrate holding means, 1120 is a first substrate, 1130 is an outer side space retaining means, 1140 is an inner side space retaining means, 1141 is a portion for exhausting the excessive recording layer forming composition, 1150 is a holographic recording layer forming composition, 1160 is a second substrate, 1161 is a portion for exhausting the excessive recording layer forming composition from the inner space retaining means, 1162 is the portion for exhausting the excessive recording layer forming composition from the outer space retaining means, 1170 is a second substrate holding means, 1171 is a suction opening for contacting the second substrate to the second substrate holding means, 1172 is a portion for exhausting the excessive recording layer forming composition from the outer side of the recording medium, 1173 is a portion for exhausting the excessive recording layer forming composition from the inner side of the recording medium. Firstly, the first substrate 1120 shown by FIG. 11(*b*) is contacted by vacuum to the first substrate holding means 1110, and then the outer space retaining means 1130 and inner space retaining means 1140 are piled for maintaining the distance between the first substrate and the second substrate as shown in FIGS. 11(*c*) and 11(*d*). In such the situation, the holographic recording layer forming composition 1150 is coated and the second substrate is softly piled on the space retaining means as shown in FIG. 11(*f*). Lastly, the second space retaining means 1170 is piled as shown in FIGS. 11(*g*) and 11(*h*) and pressure is applied while the second substrate 1160 is contacted by vacuum by sucking through the suction opening 1171. Thus the recording media can be produced which have each a uniform whole thickness at any portion thereof and the uniform designated thickness of the recording layer. Moreover, the fluctuation of the layer thickness between the individual recording media can be reduced since the substrate holding means commonly can be used.

Next, an example of the method for producing the holographic recording media having an optional shape is described below referring FIGS. 12(*a*) through 12(*e*).

In FIGS. 12(*a*) through 12(*e*), 1210 is a first substrate, 1220 is a holographic recording layer forming composition, 1130 is a second substrate. Firstly, the recording layer forming composition 1220 is coated on the first substrate 1210 as shown in FIG. 12(*a*), and the second substrate is piled and the distance between the first and second substrates is retained at the designated value as shown in FIGS. 12(*b*) and 12(*c*). Then the piled matter is successively subjected to the bubble removing treatment for removing air bubbles included in the holographic recording layer, the hardening treatment by heating or irradiation of light having wavelength different from that of the light to be used for holographic recording exposure as later-described. Thereafter, the recording layer is cut together with the substrates by irradiation of laser light beams 1240 and 1241. Thus the disc-shaped recording medium as shown in FIG. 12(*a*) can be produced. Any laser light can be used for the above purpose without any limitation as long as laser light is high power capable of cutting the piled matter. The cutting treatment either may be performed until the object is completely cut or until a degree of deepness so that the desired shaped recording medium can be easily taken off. The number of the laser light beam either may be one or more. The laser light beam may be irradiated from the side of the first substrate side, the second substrate side or the both sided of the piled matter. The angle of the laser light beam with the substrate is preferably from 50° to 90°. When the cutting is performed by the laser light beam, the piled matter may be protected to degradation of the recording surface caused by the laser light by a light shield protecting material. As the method for piling the holographic recording layer having the designated thickness between the substrates shown in FIGS. 12(*a*) through 12(*e*), for example, the producing equipment as shown FIGS. 4(*a*) through 4(*k*) can be applied in which the space is retained at only outer side of the substrate holding means.

In the above-mentioned first embodiment of the production method, the formation of the space and the provision of the recording layer forming composition are preferably performed under reduced pressure for inhibiting the mixing of bubbles into the holographic recording layer as possible as small. The reduced pressure is preferably from 0.05 kPa to 80 kPa, and more preferably from 0.1 kPa to 50 kPa, compared with the ordinary atmosphere pressure. Moreover, according to the kind of the holographic recording layer forming composition, the reduced pressure atmosphere prepared by reducing pressure after replacement of the air by inactive gas such as nitrogen or argon or the dried air is suitably utilized.

The reduced pressure is preferably from 0.05 kPa to 80 kPa, and more preferably from 0.1 kPa to 50 kPa, compared with the ordinary atmosphere pressure. Moreover, according to the kind of the holographic recording layer forming composition, the reduced pressure atmosphere prepared by reducing pressure after replacement of the air by inactive gas such as nitrogen or argon or the dried air is suitably utilized.

By the production method exemplified by the foregoing FIGS. 3(*a*) through 3(*j*), FIGS. 4(*a*) through 4(*k*), and FIGS. 11(*a*) through 11(*h*), only one of the holographic recording medium can be produced at once. However, plural of the recording media can be simultaneously produced by the use of the substrate holding means suited for the production of the plural recording media such as that later-described by FIGS. 19 (*a*) and 19(*b*).

The above-described hardening process essential in the first embodiment, the bubble removing process provided according to the necessity, the removing process for removing the holographic recording layer forming composition forced out from the substrate and the sealing process for sealing the bare portion of the of the holographic recording layer are described in the description of the second embodiment since such the process are the same as those in the later-described second embodiment.

The Second Embodiment of the Invention

FIGS. 13(*a*) through 13(*c*), FIGS. 14(*a*) through 14(*g*) and FIGS. 15(*a*) through 15(*h*) show an example of the production of the recording media using the substrate holding means for holding the first and second substrates so as to make the designated distance between the substrates.

The first substrate and the second substrate each held by the substrate holding means so as to retain the designated space between them as shown in the drawings, and to such the state, a recording layer forming composition ejecting means or a recording layer forming composition sucking means each for charging the recording layer forming composition into the space between the first and second substrate is provided.

Among the above drawings, FIGS. 13(*a*) through 13(*c*) are each a scheme of the first and the second substrate holding means, respectively, and 13(*b*) is a cross section of the first and the second substrate holding means in the piled state. In FIGS. 13(*a*) through 13(*c*), 1300 is a first substrate holding means, 1301 and 1302 are each a face to be contact to the second substrate holding means, 1301 is a second substrate holding means, 1311 and 1312 are each a face to be contact to the first substrate holding means, 1303 and 1313 are each a face for each of the substrate, 1304 and 1314 are each a suction opening for contacting the each of the substrates by vacuum, 1306 and 1316 are each a portion through which the recording layer forming composition is injected into the space between the substrates, 1307 is a control valve on the side of exhausting the composition from the space between the substrates and 1308 is a control valve on the side of charging the composition into the space between the substrates.

FIGS. 14(*a*) through 14(*g*) and FIGS. 15(*a*) through 15(*h*) describe an example of production method using the substrate holding means for keeping the distance between the first substrate and the second substrate shown in FIGS. 13(*a*) through 13(*c*) at the designated value. FIGS. 14(*a*) through 14(*g*) show the piled state in which the substrates each are contacted by vacuum to the substrate holding face of the corresponding substrate holding means and the substrate holding means are piled with together by pressing. In FIGS. 14(*a*) through 14(*g*), 1420 is a first substitute, 1430 is a second substrate, 1400 is a first substrate holding means, 1410 is the second substrate holding means, 1407 is a control valve on the exhausting side through which the holographic recording layer forming composition is exhausted from the space between the substrates, 1408 is a control valve on the charging side through which the holographic recording layer forming composition is injected between the substrates. FIG. 14(*a*) shows the first substrate, FIG. 14(*b*) shows the first substrate holding means, and FIG. 14(*c*) shows the state of first substrate contacted to the first substrate holding means by vacuum. FIG. 14(*d*) shows the second substrate, FIG. 14(*e*) shows the second substrate holding means, FIG. 14(*f*) shows a plan view of the second substrate contacted by vacuum to the second substrate holding means, and FIG. 14(*g*) shows a cross section of the piled state in which the substrate holding means each holding the substrate are piled by pressure.

FIGS. 15(*a*) through 15(*h*) show the method for charging the holographic recording layer forming composition into the space having the designated width formed by the substrate holding means shown in FIGS. 14(*a*) through 14(*g*). In FIGS. 15(*a*) through 15(*h*), 1500 is a first substrate holding means, 1510 is a second substrate holding means, 1507 is a control valve on the exhausting side through which the holographic recording layer forming composition is exhausted from the space between the substrates, 1508 is a control valve on the charging side through which the holographic recording layer forming composition is injected between the substrates, 1540 is a holographic recording layer forming composition to be charged. FIGS. 15(*a*) and 15(*b*) show the situation in which the charging of the holographic recording layer forming composition is started by applying pressure to the composition, FIGS. 15(*c*) and 15(*d*) show the situation in which the composition is charged until half of the substrate, FIGS. 15(*e*) and 15(*f*) show the state in which the space between the substrates is filled up by the composition, and FIGS. 15(*g*) and 15(*h*) are the scheme of the situation in which the valve on the charging side is closed for stopping the supply of the composition. FIGS. 15(*a*), 15(*c*), 15(*e*) and 15(*g*) are each a scheme of the horizontal cross section of the substrate holding means in a state of piled by pressure for convenience of the explanation, and FIGS. 15(*b*), 15(*d*), 15(*f*) and 15(*h*) are each a scheme of the vertical cross section of the substrate holding means piled by pressure for convenience of the explanation.

The recording media can be produced which have each a uniform whole thickness at any portion thereof and the uniform designated thickness of the recording layer and the fluctuation of the layer thickness between the individual recording media can be reduced since the substrate holding means commonly can be used when the recording layer forming composition is charged between the substrates by applying the recording layer forming composition charging means shown by FIGS. 15(*a*) through 15(*h*).

Figure 18:
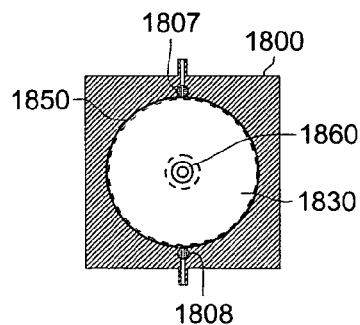
FIGS. 18(a) through 18(j) show the method for charging the holographic recording layer forming composition into the designated space between the substrates formed by the space retaining means and the substrate holding means shown in FIG. 17.
Figure 18:
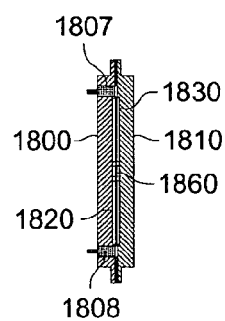
Figure 18:
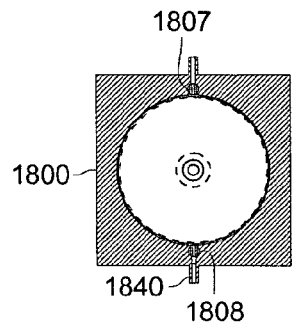
Figure 18:
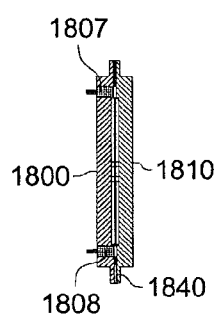
Figure 18:
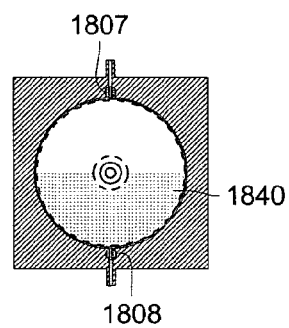
Figure 18:
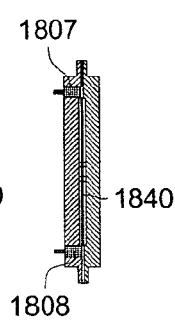
Figure 18:
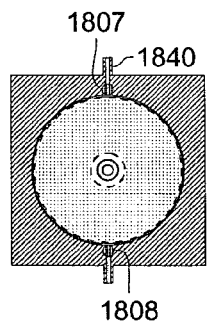
Figure 18:
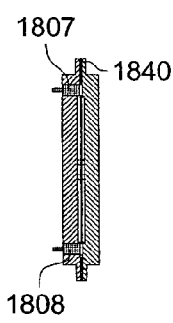
Figure 18:
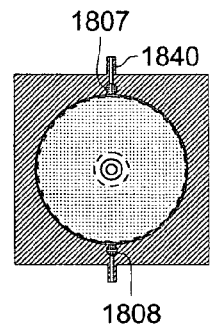
Figure 18:
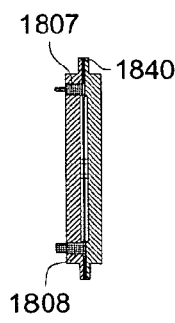
Figure 19:
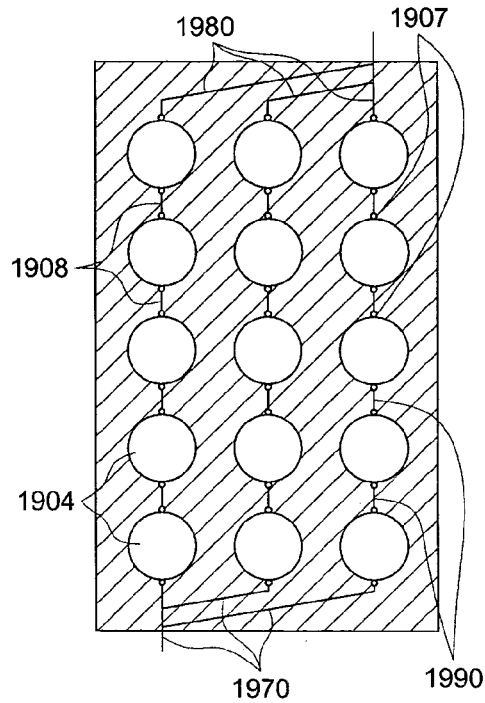
FIGS. 19(a) and 19(b) show the substrate holding means capable producing plural holographic recording media.
Figure 19:
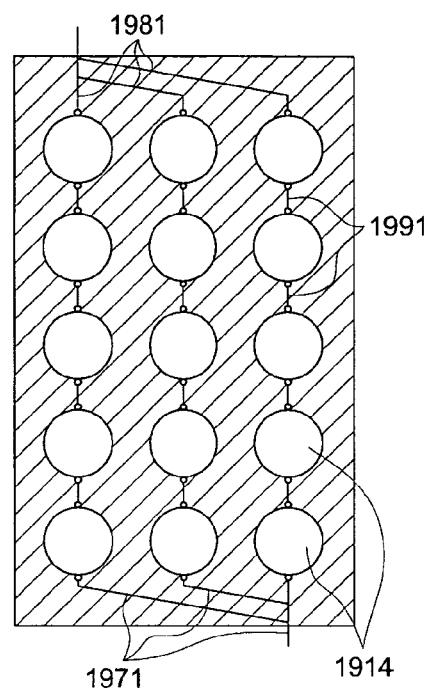
Figure 20:
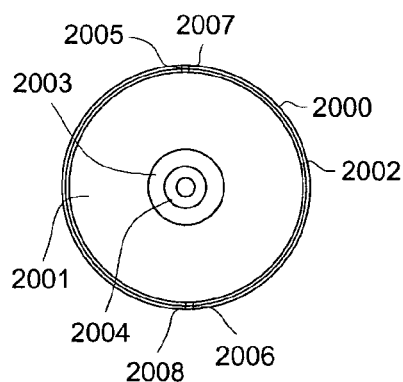
FIGS. 20(a) through 20(c) show examples of substrate with the space retaining means.
Figure 20:
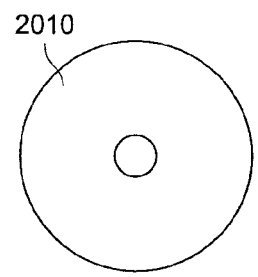
Figure 20:
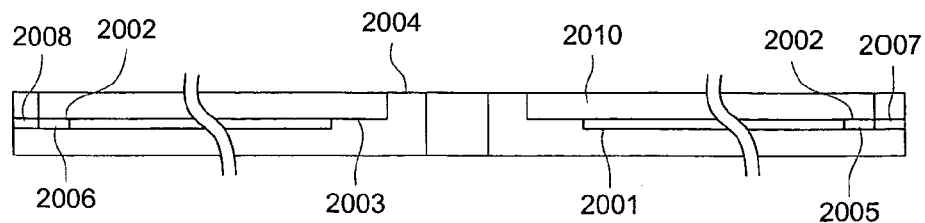
Figure 21:
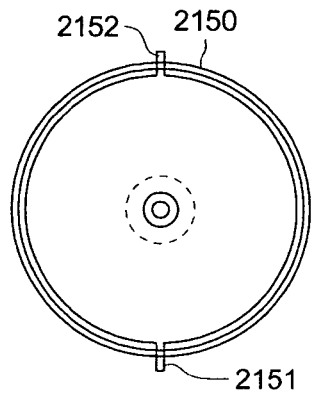
FIGS. 21(a) and 21(b) show an example of the production method using an element in which the space is retained by firmly connected the first substrate, the space retaining means and the second substrate.
Figure 21:
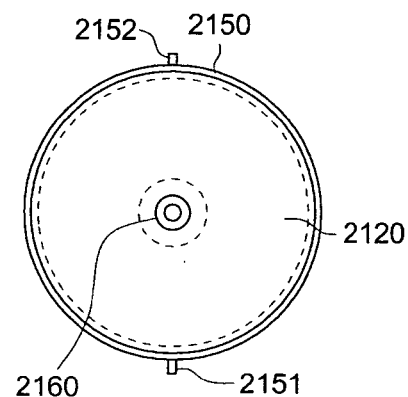

FIGS. 16(*a*) through 16(*c*), FIGS. 17(*a*) through 17(*g*) and FIGS. 18(*a*) through 18(*j*) show an example of recording media producing method using the space retaining means for folding the first and second substrates so as to retain the designated space between the substrates and the substrate folding means.

FIG. 16(*a*) is the scheme of the first substrate holding means and FIG. 16(*c*) is that of the second substrate holding means, and FIG. 16(*b*) is the cross section of the combined state of the first substrate holding means and the second substrate holding means. In FIGS. 16(*a*) through 16(*c*), 1600 is a first substrate holding means, 1601 is the face to be contact to the second substrate holding means, 1610 is the second substrate holding means, 1611 is a face to be contacted to the first substrate holding means, 1603 and 1613 are each a face for holding the substrate, 1606 and 1616 are each a portion through which the holographic recording layer forming composition is injected between the substrates, 1605 and 1615 are each the portion through which the composition is discharged from the space between the substrates, 1607 is a control valve on the side of exhausting the composition from the space between the substrates and 1608 is a control valve on the side of charging the composition into the space between the substrates.

FIGS. 17(*a*) through 17(*g*) and FIGS. 18(*a*) through 18(*j*) show an example of recording media production using the space retaining means for holding the first substrate and the second substrate so as to make the designated space between the substrates shown by FIGS. 16(*a*) through 16(*c*) and the substrate holding means for each of the substrate, and FIGS. 17(*a*) through 17(*g*) show the state in which the substrates are each contacted to the corresponding substrate holding face of the substrate holding means through the space retaining means and piled with pressure. In FIGS. 17(*a*) through 17(*g*), 1720 is a first substrate, 1730 is a second substrate, 1750 is a space retaining means for holding the outer side of the substrate so as to retain the designated space, 1760 is a second substrate, 1750 is a space retaining means for holding the inner side of the substrate so as to make the designated space, 1700 is a first substrate holding means, 1710 is a second substrate holding means, 1707 is a control valve on the side of exhausting the composition from the space between the substrates and 1708 is a control valve on the side of charging the composition into the space between the substrates. FIG. 17(*a*) shows the first substrate, FIG. 17(*b*) shows the space retaining means for keeping the designated space between the outer side of the substrates, FIG. 17(*c*) shows the space retaining means for keeping the designated space between the inner side of the substrates, FIG. 17(*e*) shows the second substrate, FIG. 17(*d*) shows the plan view of the situation in which the space retaining means are attached to the first substrate holding means while the first substrate is contacted to the first substrate holding means, FIG. 17(*f*) shows a plan view of the situation in which the second substrate is attached to the state shown by FIG. 17(*d*), and FIG. 17(*g*) is a cross section of the state in which the second substrate holding means is attached to the state shown by FIG. 17(*f*) and the substrate holding means each holding the substrate are piled by pressure.

The space retaining means 1750 used here is a member through which the holographic recording layer forming composition can be exhausted or charged from or into the space between the substrates, in concrete, the space retaining means having the portion through which the composition can be charged and exhausted as shown in FIGS. 18(*d*) and 18(*e*) are usable. The space retaining means 1760 is a member capable of keeping the space so as to have the designated interval, in concrete, the parts shown by FIG. 9(*d*) or FIG. 9(*e*) are usable from which the composition cannot be leaked. However, the space retaining means such as those shown by FIG. 9(*c*) or 9(*d*) may be used according to the position of the injection and the ejection portions of the recording layer forming composition. In such the case, at least one of the first and second substrates having the composition charging portion for injecting the recording layer forming composition into the space between the first and second substrates and the composition exhausting portion for exhausting the composition from the space between the substrates may be optionally usable according to necessity.

FIGS. 18(*a*) through 18(*j*) show the method for charging the holographic recording layer forming composition into the designated space between the substrates formed by the space retaining means and the substrate holding means shown by FIGS. 17(*a*) through 17(*g*). In FIG. 18(*a*) through 18(*j*), 1800 is a first substrate holding means, 1810 is a second substrate holding means, 1807 is a control valve on the side of exhausting the composition from the space between the substrates, and 1808 is a control valve on the side of charging the composition into the space between the substrates, 1820 is a first substrate, 1830 is a second substrate, 1850 is an outer side space retaining means, 1860 is an inner side space retaining means, 1840 is a holographic recording layer forming composition to be charged. FIGS. 18(*a*) and 18(*b*) show the situation before charging the holographic recording layer forming composition between the substrate, FIGS. 18(*c*) and 18(*d*) show the situation in which the charging of the holographic recording layer forming composition is started by applying pressure to the composition, FIGS. 18(*e*) and 18(*f*) show the situation of the composition is charged until half of the substrate, FIGS. 18(*g*) and 18(*h*) show the state in which the space between the substrates is filled up by the composition, and FIGS. 18(*i*) and 18(*j*) are the scheme of the situation in which the valve on the charging side is closed for stopping the supply of the composition. FIGS. 18(a), 18(c), 18(e), 18(g) and 18(i) are each a scheme of the horizontal cross section through the second substrate of the substrate holding means piled by pressure, and FIGS. 18(b), 18(d), 18(f), 18(h) and 18(j) are each a scheme of the vertical cross section of the substrate holding means piled by pressure for convenience of the explanation.

The recording media can be produced which have each a uniform whole thickness at any portion thereof and the uniform designated thickness of the recording layer and the fluctuation of the layer thickness between the individual recording media can be reduced since the substrate holding means commonly can be used when the recording layer forming composition is charged between the substrates by applying the recording layer forming composition charging means shown by FIGS. 18(a) through 18(j).

In the foregoing FIGS. 15(a) through 15(h) and FIGS. 18(a) through 18(j), the method for charging the holographic recording layer forming compound is described as the recording layer forming compound charging method by which the compound is charged while applying pressure. In such the case, the portion for charging the composition into the space between the substrates is preferably positioned at a position lower than that of the portion for exhausting the composition from the space between the substrates to prevent defects caused by mixing of bubbles into the charged recording layer. Moreover, a method for charging the recording layer forming composition between the first substrate and the second substrate by sucking can be applied for the method shown by the drawings. In such the case, the holographic recording layer forming composition is charged by sucking through the portion for exhausting the composition from the space between the substrates. The pressure to be applied on the occasion of the ejection charging is usually from 111 kPa to 20200 kPa, and preferably from 121 kPa to 10100 kPa, even though the pressure cannot be simply decided since the suitable pressure is changed according to the physical property of the recording layer forming composition. In the suction charging method, the reducing degree of pressure is preferably from 0.01 kPa from 60 kPa, and more preferably from 0.05 kPa to 40 kPa.

The space forming process and the recording layer forming composition providing process is preferably performed under a reduced pressure to inhibit the mixing of the bubbles in the holographic recording layer as small as possible. The reduced pressure is preferably from 0.05 kPa to 80 kPa, and more preferably from 0.1 kPa to 50 kPa, compared with the ordinary atmosphere pressure. Moreover, according to the kind of the holographic recording layer forming composition, the reduced pressure atmosphere prepared by reducing pressure after replacement of the air by inactive gas such as nitrogen or argon or the dried air is suitably utilized.

When the substrate holding means shown by FIGS. 16(a) through 16(c) are used, one holographic recording medium only produced at once. However, plural recording media can be simultaneously produced by the use of the substrate holding means shown by FIGS. 19(a) and 19(b).

In FIGS. 19(a) and 19(b), (a) is a first substrate holding means and (b) is a second substrate holding means. In the drawings, 1970 and 1971 are each a course of the injection of the holographic recording layer forming composition, 1904 and 1914 are each a substrate holding means for holding each of the substrate, 1990 and 1991 are each a course of the recording layer forming composition connecting each of the substrate holding portions, 1980 and 1981 are each a course for exhausting the holographic recording layer forming composition from the substrate holding means, 1907 is a control valve provided in the substrate holding means on the side of exhausting the composition from the space between the substrates each held by each the substrate holding means, and 1908 is a control valve provided in the substrate holding means on the side of charging the composition to the space between the substrates each held by each the substrate holding portion. In all of the foregoing production methods in the first and second embodiments, the substrate and the substrate holding means are each constituted by different matter. However, the substrate having the function of the substrate holding means can be suitably used according to the kind of the substrate to be used for the holographic recording medium. As the example of the substrate having such the portion, one shown by FIGS. 20(a) through 20(c) can be cited.

In FIGS. 20(a) through 20(c), 2000 is a second substrate, 2001 is a recording layer forming composition charging portion, 2002 and 2003 are each a space retaining means for the first substrate, 2004 is a projection for removing level difference between the first substrate, 2005 and 2007 are each a portion for exhausting the recording layer forming composition from the space between the substrates, 2006 and 2008 are each a portion for charging the composition into the space between the substrates and the 2010 is the first substrate. FIG. 20(a) is a plan view of the second substrate, FIG. 20(b) is a plan view of the first substrate, and FIG. 20(c) is a scheme of the vertical cross section of the state in which the first substrate and the second substrate are piled by pressure.

When the designated space is made between the substrates by the foregoing space retaining means or by the space retaining portion provided to the substrate in the second embodiment of the invention, it is suitably applied in the invention that the space retaining means and the substrate or the substrates are pasted with together for retaining the designated space.

An example of the method using the space retaining means firmly fixed with the second substrate is explained referring FIGS. 21(a), 21(b), 22 and 23.

Figure 22:
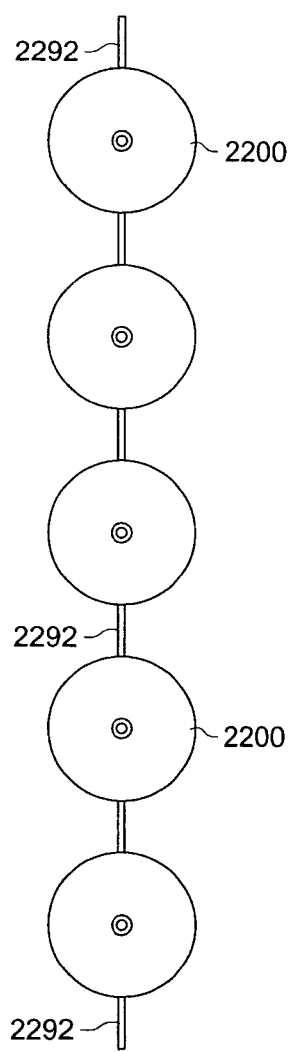
FIG. 22 shows the recording media without the recording layer and connected in series by connecting pipes.
Figure 23:
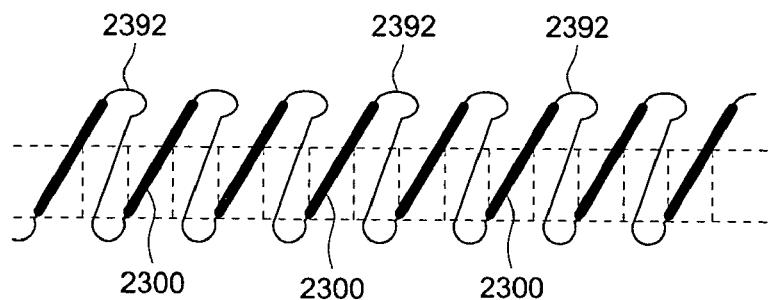
FIG. 23 shows an example of the arrangement for charging the recording layer forming composition to the recording media without recording layer connected in series by the connecting pipes.
Figure 24:
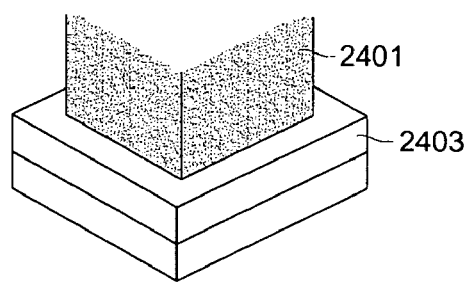
FIGS. 24(a) through 24(e) show an example using a ultrasonic vibrator as the bubble removing means.
Figure 24:
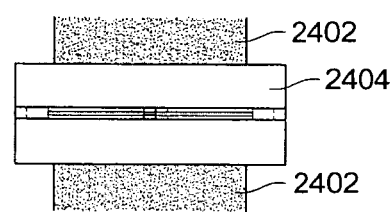
Figure 24:
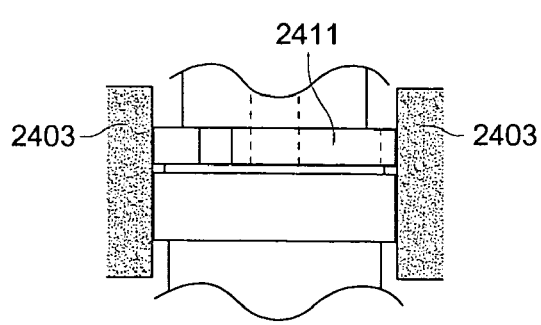
Figure 24:
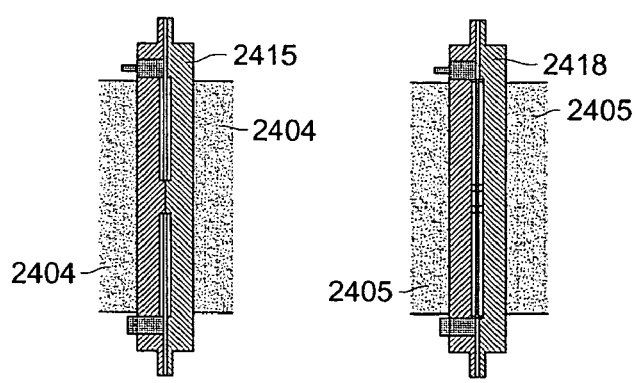
Figure 25:
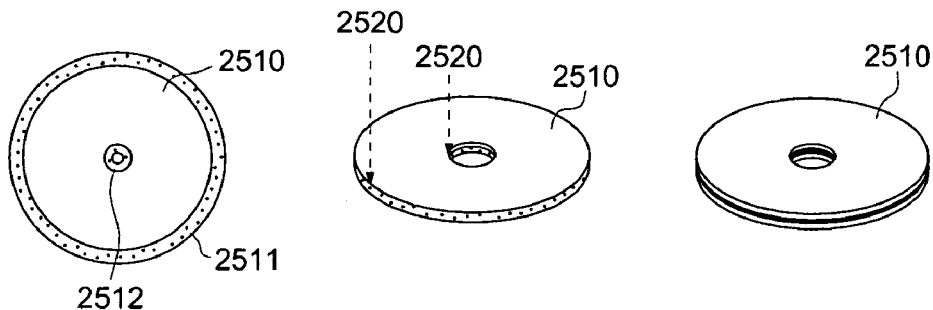
FIGS. 25(a) through 25(i) show an example of the removing means for removing the holographic recording layer forming composition forced out from the substrate.
Figure 25:
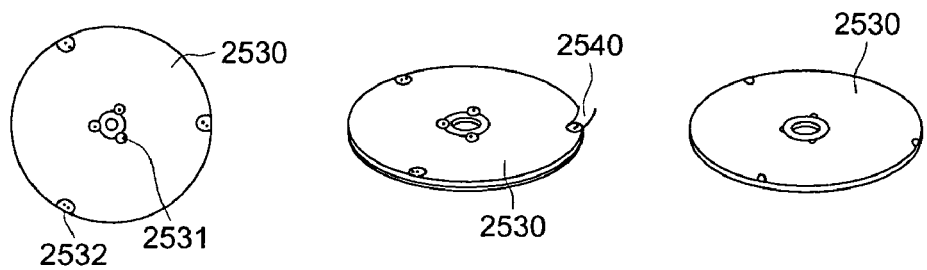
Figure 25:
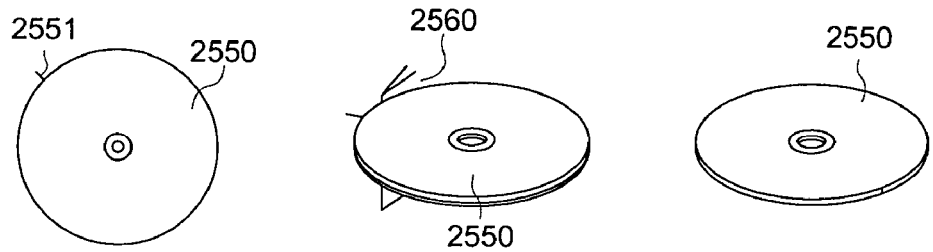
Figure 26:
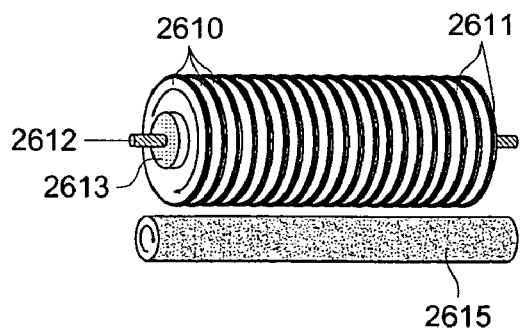
FIGS. 26(a) and 26(b) show the removing means capable of treating plural media.
Figure 26:
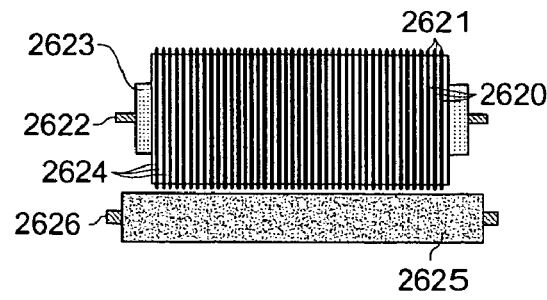
Figure 33:
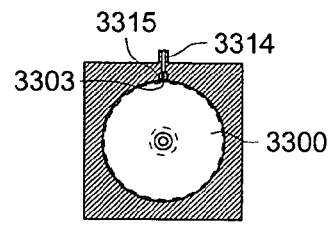
FIGS. 33(a) and 33(b) show the recording medium without the recording layer set by using the substrate holding means.
Figure 33:
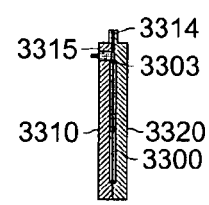
Figure 34:
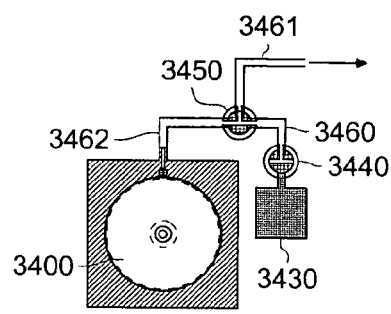
FIGS. 34(a) through 34(f) show the drawings describing the third embodiment of the holographic recording medium producing method according to the invention.
Figure 34:
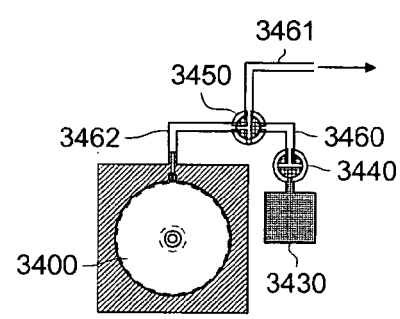
Figure 34:
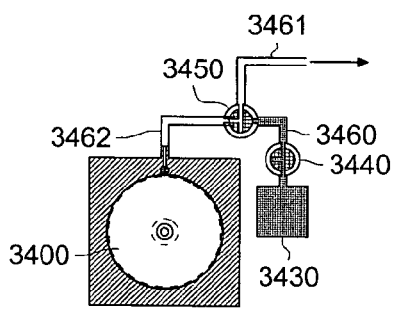
Figure 34:
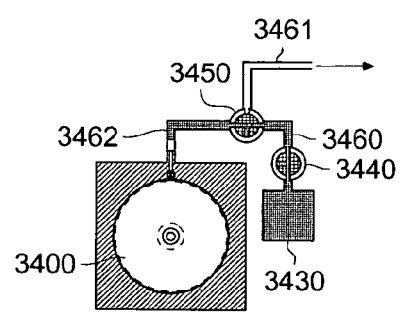
Figure 34:
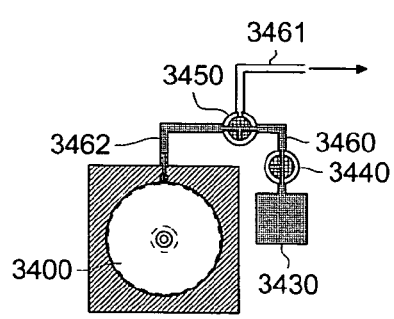
Figure 34:
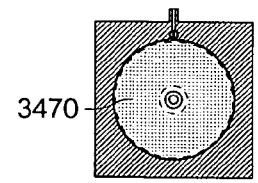

FIG. 21(a) shows the space retaining means. In FIG. 21(a), 2150 is an outer space retaining means, 2151 is a recording layer forming composition charging portion, and 2152 is a composition exhausting portion. FIG. 21(b) shows a second substrate 2120 which is pasted with a first substrate, not shown in the drawing, through the outer space retaining means 2150 and an inner space retaining means 2160 for previously reducing unevenness the thickness of the recording layer to be charged into the recording medium and unevenness of the whole thickness of the recording medium. In FIG. 22, plural recording media before charging of the recording layer forming composition 2200 shown in FIG. 21(b) are connected in series by connecting pipes 2392 for charging the recording layer forming composition into each of the media before charging of the recording composition. FIG. 23 shows an example of arrangement for charging the recording layer forming composition into the recording media before charging of the composition connected in series by the connecting pipes 2392. When an injection charging method is used, pressure is applied from the pipe at left side of FIG. 23 so that the recording layer forming composition is charged into the space between the substrates and the pressure applying is continued until the composition is overflowed from the composition exhausting portion of the right side recording medium. Thus the recording layer can be charged into all the recording media. Besides, a suction charging method is used, the air is sucked from the exhausting portion of the right side recording media and the recording layer forming composition is inhaled through the pipe at the left side so that the composition is charged between the substrates. The sucking is continued until the composition is exhausted from the exhausting portion of the right side recording medium. Thus the recording layer can be charged into all the recording media.

The recording media can be produced which has each a uniform whole thickness at any portion thereof and the uniform designated thickness of the recording layer by charging the recording layer forming composition in to the space between the substrates having such the space retaining means as shown in FIG. 23. Moreover, the fluctuation of the layer thickness between the individual recording media can be reduced by the use of the standardized space retaining means.

Next, producing processes commonly applied for the production methods of the first and the second embodiments of the invention are described in detail below.

Any bubble removing method can be applied without any limitation as long as the method can remove the air contained in the holographic recording layer charged between the first and the second substrates by deaeration while the designated space is retained. As such the bubble removing method, the following methods such as a pressure reducing method by which the holographic recording layer charged between the first and second substrates is stand for a moment under a reduced pressure, and a method by which the air contained in the recording layer being between the substrates is driven out of the substrate by irradiating ultrasonic vibration having a specific frequency oscillated by an ultrasonic wave oscillator can be optionally applied.

FIGS. 24(a) through 24(e) show an example of the use of the ultrasonic wave oscillator as the bubble removing means. In FIG. 24(a), 2403 shows the state in which the recording layer forming composition is charged between the substrates shown by FIG. 3(f) or 3(j), 2404 in FIG. 24(b) shows the state in which the recording layer forming composition is charged between the substrates shown by FIG. 4(k), FIG. 24(c) shows the state in which the recording layer forming composition is charged between the substrates shown by the foregoing FIG. 11(h), FIG. 24(d) shows the state in which the recording layer forming composition is charged between the substrates shown by FIG. 15(h), and FIG. 24(e) the state in which the recording layer forming composition is charged between the substrates shown by FIG. 18(j). In the drawings, 2401, 2402, 2403, 2404 and 2405 are each the ultrasonic vibrator.

The fine spaces and the gas dissolved in the recording layer forming composition can be driven out from the substrate by applying the vibration with the specific frequency to the state of the composition is filled between the substrates. The hardening process to be applied after the bubble removing process by heating or exposing to light having a wavelength different from that of light for holographic recording are performed for hardening some degree the recording layer forming composition according to the invention to make the composition to difficultly fluidable. The temperature for the hardening by heat is usually from 20° C. to 180° C., and preferably from 25° C. to 150° C. The preferable time for heating treatment at a temperature of 100° C. or more is from 0.1 seconds to 2 hours, that at a temperature of from 50° C. to less than 100° C. is from 1 minute to 1 week, and that at a temperature of less than 50° C. is from 1 hour to 1 month. For heating process, the methods such as a method of heating by in an oven while keeping the designated space, and a method, when the substrate holding means, of heating the substrate holding means by a heater built in near the face of the substrate holding means to be contacted to the substrate can be optionally applied. When the substrate holding means is not used, for example, in the case of that the recording medium is produced by the use of the space retaining means only such as that shown in FIG. 23, the hardening can be performed by the method shown by FIGS. 36(a) through 36(d). As is shown in FIGS. 36(a) and 36(b), heating treatment can be performed by contacting the heating block 3610 having heating members 3611 and 3612. In the drawings, 3600 is the part of the substrates filled by the recording layer, 3620 and 3621 are the pipes connecting between the portions of the substrates each filled by the recording layer.

When the recording layer is hardened by irradiation of light different in the wavelength from light to be used for holographic recording, the wavelength of the light is preferably longer 50 nm or more, and more preferably longer 100 nm, than that of the laser light for holographic recording exposure. The hardening method of wholly and uniformly irradiating the recording medium by the light is shown in FIGS. 35(a) through 35(e). In the case of that the hardening is carried out by light, when the substrate holding means transparent to the wavelength of the light is used, the recording medium can be wholly irradiated and hardened by the light by the method such as that shown by FIG. 35(a) with respect to the medium prepared according to FIG. 4(k), that shown by FIG. 35(b) with respect to the medium prepared according to FIG. 18(j), and that shown by FIG. 35(d) with respect to the medium prepared according to FIG. 23 using the substrate holding means.

Removal of the holographic recording layer forming composition forced off from the substrate after hardening by the foregoing hardening treatment for making the recording layer to non-fluidable is a process to remove the excessive part of the medium so as to remove the hindrance for practical use. As the removal method, methods usually applied in various field such as methods by wiping out, cutting out and shaving the excessive part can be optionally applied as long as the properties of as the holographic recording medium is not degraded by the treatment. Some examples of the methods for removing the holographic recording layer forming composition forced off from the substrate are shown in FIGS. 25(a) through 25(i).

FIG. 25(a) shows the recording medium treated until the hardening treatment in the production method of FIGS. 4(a) through 4(k), the recoding medium has the recording layer forming composition forced off from the outer side 2511 of the first substrate 2510 and that forced off to inner side 2512. FIG. 25(b) is a scheme of the process for cutting off the excessive portion of the composition by irradiating laser light to the edge of the substrate, and the FIG. 25(c) is a scheme of the recording medium after removing the excessive part by the removing process shown by FIG. 25(c). FIG. 25(d) shows the recording medium treated until the hardening treatment in the production method of FIGS. 11(a) through 11(h), the recoding medium has the recording layer forming composition forced off 2531 and 2532 from the second substrate 2530. The recording medium such as that shown by FIG. 25(f) can be prepared by shaving the forced off portion by a claw-like tool 2540 for shaving off the excessive portion. FIG. 25(g) show a medium treated until the hardening process which has a forced off part 2251 from the first substrate 2550. The recording medium shown by FIG. 25(i) can be prepared by removing the forced off part by a sharp cutting tool 2560 capable of cutting the excessive part as shown by FIG. 25(h).

The removing method shown by FIGS. 25(a) through 25(i) is a method for removing the excessive part of the recording medium one by one. FIGS. 26(a) and 26(b) show a excessive part removing method by which plural media can be simultaneously treated. For example, the plural recording media 2610 produced by the producing method shown by FIGS. 18(a) through 18(j) and treated until hardening process are fixed to a rotatable shaft 2612 by a fixing tool 2613 as shown in FIG. 26(a). The recording media 2610 each has the portion 2611 through which the recording layer forming composition is charged or exhausted. The media fixed to the rotatable shaft are touched to a grinder 2615 having a grinding agent on the surface thereof to remove the excessive part by grinding. Thus the excessive parts of the plural recording media can be removed at once. In the method shown by FIG. 26(b), plural recording media 2620 produced by the producing method shown by FIGS. 15(a) through 15(h) and treated until hardening process are fixed to a rotatable shaft 2622 by a fixing tool 2623 through a cushion 2624 for protecting the recording media 2620. A visible portion of the recording layer 2621 is on the medium. The media fixed to the shaft are touched to a grinder having a grinding agent on the surface thereof and rotated by a shaft 2626 to remove the excessive part of the substrate and/or recording layer by grinding. Thus plural media having the trued up edges can be produced at once.

The sealing process to be applied at the last step of the production for sealing the portion, where the holographic recording layer is bare, is described referring some examples.

FIGS. 27(a) through 27(e) show an example of the tool for sealing the bare portion of the recording layer. The sealing tool 2720 shown by FIG. 27(a) is a rotation type tool having a face 2721 for supplying a sealing material to the surface and a rotatable shaft, and the tool 2730 shown by FIG. 27(b) is a rotation type tool having a shaft the same as that in the tool shown by FIG. 26(a), grooves fitted to the thickness of the recording medium and a face 2731 for supplying a sealing agent. The sealing tool 2740 shown by FIG. 27(c) is an extrusion type sealing tool having a nozzle 2741 extruding the sealing agent. Moreover, the bare portion of the holographic recording layer can be sealed by transferring a sealing layer itself. For example, as is shown in FIG. 27(d), sealing layers 2751 and 2752 are provided to the sealing layer transferring means. The sealing tool shown by FIG. 27(e) is a transfer ribbon type sealing tool having a supplying roller 2763 of a sealing layer transfer ribbon 2760, a wind up roller 2762 and a platen roller 2761 for pressing the transfer ribbon to the outer edge of the recording medium.

Next, the concrete sealing method using the foregoing sealing tool and the sealing material is described below referring FIGS. 28(a) through 28(i).

A recording medium 2803 shown by FIG. 28(b) has bare areas of the recording layer 2804 and 2805. For sealing the recording medium, for example, an inner sealing member 2801 having a claw for making the designated space between the first substrate and the second substrate is put at the inner side of the recording medium 2803 to seal the inner side of the medium. On this occasion, an adhesive agent may be coated on the substrate and the face to be contacted to the holographic recording layer of the inner sealing means 2801. Next, a method for sealing the bare area of holographic recording layer 2805 at the outer side of the medium is described below. FIG. 28(d) is an example of sealing by the use of the rotation type tool 2820 such as that described in detail by FIG. 27(a). The outer edge of the recording medium can be sealed by touching the sealing agent supplying face 2821 to the bare area of the recording layer and synchronously rotating the recording medium 2803 and the rotation tool 2820. FIG. 28(e) shows an example of sealing by the use of a rotation type tool 2830 such as that described in detail by FIG. 27(b), in which the sealing agent supplying surface 2831 is touched to the surface of the bare area of the recording layer and the recording medium and the rotation type tool 2830 are synchronously rotated. Thus the outer side of the medium including a part of the outermost surface of the medium can be uniformly sealed. FIG. 28(g) shows an example of sealing by the use of the transfer ribbon type sealing tool such as that described in detail by FIG. 27(e). A sealing layer transfer ribbon 2860 is pressed to the outer edge of the recording medium by a platen roller 2861 at a portion between a supplying roller 2863 and a wind up roller 2862, and the sealing layer transfer ribbon 2860 is synchronously wound up with the rotation of the recording medium 2803. Thus the outer edge of the recording medium is uniformly sealed.

FIG. 28(f) shows an example of sealing by the use of the extrusion type sealing tool such as that described in detail by FIG. 27(c). In this method, a recording medium 2809, which has a recording layer bare portion 2809 and is held by space retaining means 2807 and 2808, is rotated to adhere thereon the sealing agent extruded from a sealing agent extrusion nozzle 2841 of a sealing tool 2840. Thus the sealing is carried out. In such the case, the sealing agent either may be extruded only to the bare portion or to all circumference edge of the recording medium 2806. FIGS. 28(h) and 28(i) show an example of sealing by the use of a sealing layer transfer means 2850 on which sealing layers 2851 and 2852 are previously provided such as described in detail by FIG. 27(d). In this case, a sealing layer transfer means 2850 is contacted to a recording media 2810 and the sealing layer is only transferred by pressure or heat and pressure onto the recording medium for sealing the recording media which has portions of bare holographic recording layer 2814 and 2813 and held by space retaining means 2812 and 2811. In the method shown by the drawings, the sealing layer is transferred only to the portion to be sealed. However, the sealing layer may be transferred to all the surface of the recording medium including the portion of bare recording layer thereon as long as the recording and reproduction property of the recording medium is not influenced by the sealing layer.

The Third Embodiment of the Invention

FIGS. 29(a) through 29(e) show the structure of a recording medium before charging of holographic recording layer forming composition held in which first and second substrates are held by space retaining means. FIG. 29(a) shows the first substrate, FIG. 29(b) shows an outer side space retaining means 2902 for retaining the designated space between the outer side of the substrates, which has a portion 2903 through which the recording layer forming composition is injected, FIG. 29(c) shows an inner side space retaining means 2904 for retaining the designated space between the inside of the substrates, FIG. 29(d) shows a second substrate 2905, and FIG. 29(e) show a plan view of a medium before charging of composition which constituted by holding substrate space retaining means and each substrates which are connected by a adhesive agent so as to retain the designated space.

FIGS. 30(a) through 30(f) show an example of charging the holographic recording layer forming composition into a recording medium before charging of the composition. In drawings, 3000 is the recording medium before charging of the composition, 3003 is a portion through which the holographic recording layer forming composition is injected, 3010 is a pressure reducible chamber, 3020 is a pressure controlling means for controlling the pressure, 3020 is the holographic recording layer forming composition, 3040 is a composition supplying means for supplying the holographic recording layer forming composition, 3050 is a pressure keeping valve for keeping the pressure in the pressure reducible chamber, and 3060 is the recording medium filled by the holographic recording layer forming composition. At the beginning, as is shown by FIG. 30(a), the pressure in the pressure reducible chamber 3010 is reduced by sucking the gas in the chamber through the pressure controlling means 3020 to wholly reduce the pressure in the recording medium before the composition and in the entire chamber. Then the pressure keeping valve is closed after some degree of the reduced pressure is kept as shown by FIG. 30(b), and a recording layer forming composition injecting portion 3003 is immersed into the composition stored in a composition storing tank and the pressure keeping valve is open to restore the pressure in the chamber 3010 to the ordinary pressure while the recording layer forming composition injection portion is immersed into the composition as shown in FIG. 30(d). The holographic recording layer forming composition 3030 can be charged into the empty space in the recording medium 3000 by restoring the pressure to the ordinary pressure such as shown by FIG. 30(e). Finally, the recording medium 3060 filled by the holographic recording layer forming composition 3030 is turned so that the recording layer forming composition injecting portion of the recording medium is brought at the upper position as shown by FIG. 30(f). Thus the recording media filled by the recording layer forming composition can be prepared, from which the recording layer forming composition is not escaped even if the recording medium is stand under the ordinary pressure.

As above-described, the recording media having each a uniform whole thickness at any portion thereof and the uniform designated thickness of the recording layer by charging the recording layer forming composition into the empty space between the substrates by using the pressure controllable recording layer forming composition charging means as shown in FIGS. 30(a) through 30(f). Moreover, the fluctuation of the layer thickness between the individual recording media can be reduced by the use of the standardized space retaining means.

A bubble removing process for removing the air layer included in the holographic recording layer forming composition being between the first and second substrates by deaeration, and a hardening process by heating or irradiation of light having a wavelength different from that of light to be used for holographic recording exposure to be performed after the bubble removing process, to be applied in the fifth embodiment may be optionally selected from those described in detail in the first through fourth embodiments. For example, the light hardening treatment shown in FIG. 35(e) and the heat hardening treatment shown in FIGS. 36(c) and 36(d) can be applied. In FIG. 36(c), 3600 is a recording medium filled by the recording layer forming composition, and 3630 and 3640 are heating blocks and 3631 and 3641 are heating means.

A means for removing the holographic recording layer forming composition forced off from the substrate to be applied after the hardening treatment, a means for cutting the medium into designated sized after the hardening treatment, and a means for sealing the bare portion of the holographic recording layer are also optionally selected from those described in detail in the first through fourth embodiments.

Next, an example of the production method using the suction recording layer forming composition charging method for charging the composition is described below referring the drawings.

FIGS. 31(a) through 31(e) show the constitution of an empty recording medium in which the recording layer forming composition is not charged yet, in which first and second substrates are each held by a space retaining means. FIG. 31(a) shows the first substrate 3101, FIG. 31(b) shows an outer side space retaining means 3102 for keeping the space between the outer side of the substrates which has a portion 3103 through which the recording layer forming composition is injected, FIG. 31(c) shows an inner side space retaining means 3104 for retaining the space between the inner side of the substrates, FIG. 31(d) shows a second substrate, and FIG. 31(e) shows a plan view of empty recording medium 2900 which is constituted by the space retaining means and the substrates each held so as to make the designated space between them.

FIGS. 32(a) through 32(c) show a substrate holding means. Among them, FIG. 32(a) shows a first substrate, FIG. 32(c) shows a second substrate, and FIG. 32(c) shows a cross section of a piled state of the first substrate and the second substrate. In FIGS. 32(a) through 32(c), 3210 is the first substrate holding means, 3211 is a face to be contacted to the second substrate, 3220 is a second substrate holding means, 3221 is a face to be contacted to the first substrate, 3212 and 3222 are each a face for holding each of the substrates, 3213 and 3223 are each a suction hole for contacting the substrate by vacuum, 3214 and 3224 are each a portion through which the holographic recording layer forming composition is injected in to the space between the substrates, and 3215 is a controlling valve for controlling the composition on the occasion of the injection of the composition into the space between the substrate of the empty recording medium.

FIGS. 33(a) and 33(b) show the state of the empty recording medium shown by FIGS. 31(a) through 31(e) is set by using the substrate holding means shown by FIG. 32(a) through 32(c). FIG. 33(a) shows a scheme of horizontal cross section of the substrate holding means in a state of piled by pressure seen through the second substrate and FIG. 33(b) shows a scheme of vertical cross section of the substrate holding means in a state piled by pressure. In the drawings, 3300 is an empty recording medium before charging of the recording layer forming composition, 3303 is a portion through which the recording layer forming composition is injected, 3314 is a portion through which the recording layer forming composition is injected into the empty recording medium held in the substrate holding means, 3315 is a controlling valve for injecting the composition into the empty recording medium, 3310 is a first substrate holding means, and 3320 is a second substrate holding means.

FIGS. 34(a) through 34(f) show an example of method for charging the holographic recording layer forming composition into an empty recording medium held by the substrate holding means shown by FIGS. 33(a) and 33(b). In the drawings, 3400 is an empty recording medium, 3430 is a composition supplying means in which the holographic recording layer forming composition is charged, 3440 is a supplying control valve for controlling the composition supplied from the composition supplying means, 3450 is a pressure reducing control valve for controlling the reducing degree of the pressure, 3460 and 3462 are each a reducing pressure controlling and composition supplying pipe, 3461 is a reduced pressure controlling pipe, 3470 is the recording medium filled by the holographic recording layer forming composition. The supplying control valve 3440 and the reduced pressure control valve 3450 are each a three-way valve. Firstly, the pressure is reduced by sucking gas through the reducing pressure control pipe as shown by FIG. 34(a). In this occasion, the pressure reduced places is interior of the empty recording medium 3400, pipes 3462 and 3460, the three-way supplying control valve 3440, and the three-way pressure control valve 3450. The three openings of the supplying-control valve 3440 are each opened to the pipe 3460, 3462 and pressure reducing pipe 3461, respectively, and only one of the three way reducing pressure control valve 3450 is opened to the pipe 3460. Then the openings of the three-way valve 3450 are moved so as to only connect the pipe 3462 to the reduced pressure control pipe 3461 as shown by FIG. 34(b), and to fix the pressure reduced state in the pipe 3460 and the supplying control valve 3440. Thereafter, the openings of the three-way valve 3440 are moved so as to only connect the composition supplying means 3430 to the pipe 3460 as shown by FIG. 34(c), and the recording layer forming composition is charged into the supplying control valve 3440 and the pipe 3460. Then the openings of the three-way valve are moved so as to close the reduced pressure control pipe 3461 and connect the pipe 3460 to the pipe 3462 as shown by FIG. 34(d), and the recording layer forming composition is supplied to the pipe 3462 from the pipe 3461 through the reduced pressure control valve. Thus the recording layer forming composition can be charged into the empty recording medium in the reduced pressure state to prepare the recording media 3470 filled as shown by FIG. 34(e). Finally, the pressure is restored to the ordinary pressure by stopping the suction and the three openings of the reduced pressure control valve 3450 are moved so that the openings are each connected to pipe 3460, pipe 3462 and the reduced pressure control pipe 3461. Then the pipe 3462 is removed. Thus the holographic recording layer forming composition can be charged to the recording medium held by the substrate holding means.

The recording media can be produced which has each a uniform whole thickness at any portion thereof and the uniform designated thickness of the recording layer by charging the recording layer forming composition into the empty space between the substrates by using the pressure controllable recording layer forming composition charging means as shown in FIGS. 34(a) through 34(f). Moreover, the fluctuation of the layer thickness between the individual recording media can be reduced by the use of the standardized space retaining means.

A bubble removing process for removing by deaeration the air layer included in the holographic recording layer forming composition charged between the first and second substrates, and a hardening process by heating or irradiation of light having a wavelength different from that of light to be used for holographic recording exposure to be performed after the bubble removing process, to be applied in the fifth embodiment may be optionally selected from those described in detail in the first through fourth embodiments. Among them, the light hardening can be performed as shown in FIG. 35(c) as the hardening method. The bubble removing and the hardening may be performed either in the state in which the pipe is removed as shown by FIG. 34(f) or the pipe is not removed. A means for removing the holographic recording layer forming composition forced off from the substrate to be applied after the hardening treatment, a means for cutting the medium to designated sized after the hardening treatment, and a means for sealing the bare portion of the holographic recording layer are also optionally selected from those described in detail in the first through fourth embodiments.

As the holographic recording layer forming composition to be used in the production of the holographic recording medium may be optionally selected from those described in, for example, JP O.P.I. Publication Nos. 5-107999, 6-301322, 8-101500, 1-101501 and 8-160842, U.S. Pat. Nos. 6,103, 454 and 6,482,551, U.S. patent application Publication No. 2003/44690, and International Patent Nos. 2003/23519 and 2003/23520.

Any transparent material which does not occur any expansion and contraction under using temperature condition and is inactive to the holographic recording layer forming composition can be used as the first and the second substrates without any limitation. Examples of such the material include glass such as quartz glass, sodium glass, potassium glass, lead crystal glass, borosilicate glass, aluminosilicate glass, titanium crystal glass, and crystallized glass, and various kind of resin such as polycarbonate, polyacetal, poly(ether-ether-ketone), polysulfone, polyethersulfone, polyimide such as poly(imide-amide), and polyetherimide, polyamide, and a ring opening polymer of cyclic polyolefin.

The first substrate to be arranged at the incidence side of the information recording light and the reference light is preferably made by glass from the viewpoint of the thickness variation depending on the temperature and the moisture on the occasion of the holographic recording exposure and the transmittance of light from the light source for the holographic recording. Although the material of the second substrate is also preferable glass, the substrate may be made from resin, even though which is not a material inhibited in the expansion and contraction and the thickness variation, when the equipment for reading the holographic recorded information by a CCD has a focus compensation mechanism.

The transmittance of the first substrate at the incidence side of the information recording light and the reference light is preferably not less than 70%, and more preferably not less than 80%, since the loss of the light to be attained to the holographic recording layer. It is preferable for raising the transmittance as high as possible that the surface of the first substrate opposite to the surface facing to the holographic recording layer is subjected to a reflection inhibiting treatment. There is no limitation on the material to be used for the reflection inhibiting treatment as long as the refractive index thereof is lower than that of the material of the first substrate. For example, a metal fluoride such as $AlF_3$, $MgF_2$, $AlF_3 \cdot MgF_2$, $CaF_2$, and an organic fluorine compound, for example, a homopolymer, copolymer graft polymer and block polymer each containing a fluorine atom such as vinylidene fluoride and perfluoroethylene, and a modified polymer decorated by a fluorine-containing functional group are preferred since these compounds each have a refractive index lower than that of the foregoing substrate.

As the method for providing the layer of the fluorine-containing compound, known methods such as a sol-gel method, a vacuum evaporation method, a spattering method, a CVD method and a coating method, and those described in JP O.P.I. Publication Nos. 7-27902, 2001-123264 and 2001-264509 are optionally usable, even though the method cannot be decided unconditionally since the condition is varied depending on the kind of the substrate or the fluorine compounds.

The thickness of the reflection inhibiting layer is usually from 0.001 to 20 μm, preferably from 0.005 to 10 μm, even though the thickness cannot be decided unconditionally since the condition is varied depending on the surface treatment or the material of the substrate.

In the recording media to be used in holographic recording-reproducing equipment such as those disclosed in JP O.P.I. Publication No. 2002-123949 and International Patent Publication 99/57719, it is preferable that the reflective layer is provided on the surface facing to the holographic recording layer or the opposite surface of second substrate. When such the reflective layer is provided, the layer has a reflectance of not less than 70%, and more preferably not less than 80%, to the wavelength of light to be reflected.

There is no limitation on the reflective layer as long as the desired reflectance can be obtained, and usually a metal thin layer may be provided on the surface of the substrate. For forming such the reflective layer, a single crystal or polycrystal of the metal can be provided by a known method such as an ion plating method and a spattering method in a form of the thin layer. The metal thin layer can be formed by one or more kind of metal such as aluminum, zinc, antimony, indium, selenium, tin, tantalum, chromium, lead, gold, silver, platinum, nickel, niobium, germanium, silicon, molybdenum, manganese, tungsten, and palladium. The thickness of the metal thin layer is usually from 1 to 3000 nm, and preferably from 5 to 2000 nm even though the thickness is not limited as long as the desired reflectance can be obtained.

On the other hand, with respect to the holographic recording medium, a high memory capacity recording medium can be prepared by making the thickness of the recording layer as thick as possible. However, in the invention, considering the using environmental condition and the reading error, the thickness of the recording layer is preferably satisfies the relation of $0.15 \leq Dh/(D1+D2) \leq 2.0$, wherein D1 is the thickness of the first substrate, D2 is the thickness of the second substrate and Dh is the thickness of the holographic recording layer.

In the case of $0.15 < Dh/(D1+D2)$, the thickness of the holographic recording layer cannot be increased, when the thickness of the recording layer is increased, the whole thickness of the recording media is made thicker since the increasing of the thickness of the substrate is necessary. Such the recording medium is not preferred since the weight of the medium is large and excessive loading to the driving system of the recording and reading equipment tens to occur. Besides, in the case of $Dh/(D1+D2) \leq 2.0$, the thickness of the recording medium can be reduced while maintaining the thickness of the recording layer. In such the case, however, the thickness of the recording layer is become too thick concerning in regard to the thickness of the substrate. Such the medium is not preferred since the precision of the surface and the unevenness of the thickness of the recording medium under the using environments tend to be degraded and the variation of the recording layer thickness and the running off of the first substrate from the second substrate tend to be caused by the application of accidental force.

Moreover, the thickness of the first substrate and that of the second substrate preferably have the relation of $D1 \leq D2$ from the view point of the energy loss of the holographic exposure light, and the ratio of the thickness D1 to that of D2 is preferably within the range of $0.20 \leq D1/D2 \leq 1.00$ for keeping the flatness of the recording medium.

The thickness of the holographic recording layer is preferably from 200 μm to 2.0 mm. When the thickness is less than 200 μm, a recording medium having high memory capacity cannot be obtained. When the thickness is larger than 2.0 mm, the degradation of the surface precision and the unevenness of the thickness of the recording layer depending on the temperature of the using condition tend to occur.

The shape of the medium is not limited as long as the shape is suited to the holographic recording and reproducing equipment, for example, disc-shaped one is preferred for using in equipment such as that disclosed in U.S. Pat. No. 5,719,691 and JP O.P.I. Publication No. 2002-123949, and card-shaped one is preferable for the equipment described in International Patent Publication 99/57719.

Effect of the Invention

As above-described, the holographic recording medium in which the whole thickness of the recording medium is uniform at any portion thereof, the designated thickness of the holographic recording layer and the quality fluctuation between the individual media is inhibited, can be produced by the use of the space retaining means for retaining the uniform space between the substrate, the selection of the various methods for charging the holographic recording layer forming composition, and the application of hardening treatment for hardening the composition while uniformly retaining the space between the substrates according to the invention. Moreover, the recording media produced by the method according to the invention show high reliability on the occasion of the recording and the reproducing since the recording media have little variation between the production lots thereof, high uniformity of the recording layer thickness and high surface precision. The production method of the holographic recording media can be provided by the invention, by which recording media with small deformation and small fluctuation of the property are produced.

What is claimed is:

1. A method for producing a holographic recording medium having a holographic recording layer between a first substrate and a second substrate comprising the steps, conducted sequentially in the following order, of:

holding the first substrate on a first surface of a first substrate holding member and the second substrate on a second surface of a second substrate holding member respectively, wherein the first surface and the second surface are provided with suction openings respectively;

reducing a pressure between the first substrate and the first surface of the first substrate holding member through the suction openings on the first surface and a pressure between the second substrate and the second surface of the second substrate holding member through the suction openings on the second surface respectively so that the first substrate is brought in close contact with the first surface and the second substrate is brought in close contact with the second surface;

forming a space between the first substrate and the second substrate with at least one opening through which a holographic recording layer forming composition is charged into the space on the condition of holding the first substrate and the second substrate so that the designated distance is retained between the substrates, charging the holographic recording layer forming composition into the space through the at least one opening to form the holographic recording layer, and hardening the holographic recording layer by at least one of heat and light.

2. The method of claim 1, wherein the holographic recording layer forming composition is charged into the space by injecting the composition through the opening.

3. The method of claim 1, wherein the opening has an injection portion through which the holographic recording layer forming composition is injected into the space and a exhausting portion through which the holographic recording layer forming composition is exhausted from the space and the holographic recording layer forming composition is charged into the space, and
wherein the step of charging comprises the step of:
sucking air through the exhausting portion to charge the holographic recording layer forming composition into the space through the injection portion.

4. The method of claim 1, further comprising the step of:
providing a first space retaining member between the outer periphery of the first substrate and the second substrate during holding the first substrate and the second substrate so that the designated distance is retained between the substrates.

5. The method of claim 4, wherein the first space retaining member has a composition charging portion for charging the holographic recording layer forming composition into the space and a composition exhausting portion for exhausting the holographic recording layer forming composition from the space.

6. The method of claim 1,
holding the first substrate by the first substrate holding means;
holding the second substrate by the second substrate holding means; and
wherein the step of forming the space comprises the step of:
facing the second substrate held by the second substrate holding member to the first substrate held by the first substrate holding member.

7. The method of claim 6, further comprising the step of:
providing a second space retaining member between the inner periphery of the first substrate holding member and the second substrate holding member during the facing the second substrate to the first substrate.

8. The method of claim 6, wherein the first substrate and the first substrate holding member are contacted by vacuum.

9. The method of claim 8, wherein the second substrate and the second substrate holding member are contacted by vacuum.

10. The method of claim 1, further comprising the step of:
removing the holographic recording layer forming composition forced out from the area of facing the second substrate to the first substrate.

11. The method of claim 1, further comprising the step of:
cutting the holographic recording medium into a designated size after the step of hardening.

12. The method of claim 1, further comprising the step of:
sealing the bare portion of the holographic recording layer.

13. The method of claim 1, wherein at least one of the first substrate and the second substrate has a composition charging portion for charging the holographic recording layer forming composition into the space and a composition exhausting portion for exhausting the holographic recording layer forming composition from the space.

14. The method of claim 1, wherein the steps of charging is performed under a reduced pressure.

15. The method of claim 1, further comprising the step of:
removing a bubble included in the holographic recording layer formed by the step of forming.

16. The method of claim 1, wherein the holographic recording medium satisfies the relation of $0.15 \leq Dh/(D1+D2) \leq 2.0$ wherein D1 is the thickness of the first substrate, D2 is the thickness of the second substrate and Dh is the thickness of the holographic recording medium.

17. The method of claim 16, wherein the thickness of the holographic recording layer Dh is from 200 μm to 2.0 mm.

18. The method of claim 16, wherein the relation of the thickness of the first substrate D1 and the thickness of the second substrate D2 is $D1 \leq D2$.

19. The method of claim 1, wherein the first substrate is transparent and subjected to an anti-reflection treatment on the side opposite to the side on which the holographic recording layer is provided.

20. The method of claim 1, wherein the material of the first substrate is glass.

21. The method of claim 1, wherein a reflective layer having a reflectance of not less than 70% is provided on the at least one of the face of the second substrate on which the holographic recording layer to be provided and the face opposite thereto.

22. The method of claim 1, wherein the shape of the holographic recording medium is a disc.

23. The method of claim 1, wherein the shape of the holographic recording medium is a card.

* * * * *